United States Patent
Hasegawa et al.

(10) Patent No.: US 9,906,437 B2
(45) Date of Patent: Feb. 27, 2018

(54) COMMUNICATION SYSTEM, CONTROL APPARATUS, CONTROL METHOD AND PROGRAM

(71) Applicant: NEC Corporation, Tokyo (JP)

(72) Inventors: Yohei Hasegawa, Tokyo (JP); Yohei Iizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 223 days.

(21) Appl. No.: 14/433,012

(22) PCT Filed: Oct. 2, 2013

(86) PCT No.: PCT/JP2013/076823
§ 371 (c)(1),
(2) Date: Apr. 1, 2015

(87) PCT Pub. No.: WO2014/054691
PCT Pub. Date: Apr. 10, 2014

(65) Prior Publication Data
US 2015/0263939 A1 Sep. 17, 2015

(30) Foreign Application Priority Data

Oct. 3, 2012 (JP) .................................. 2012-221482

(51) Int. Cl.
*H04L 12/721* (2013.01)
*H04L 12/717* (2013.01)
(Continued)

(52) U.S. Cl.
CPC .............. *H04L 45/38* (2013.01); *H04L 45/04* (2013.01); *H04L 45/42* (2013.01); *H04L 47/125* (2013.01);
(Continued)

(58) Field of Classification Search
CPC .............................. H04L 45/38; H04L 45/42
See application file for complete search history.

(56) References Cited

U.S. PATENT DOCUMENTS 7,903,557 B1    3/2011    Colloff et al.
8,532,087 B2    9/2013    Kojima et al.
(Continued)

FOREIGN PATENT DOCUMENTS

JP    2005-159942 A    6/2005
JP    2005-223522 A    8/2005
(Continued)

OTHER PUBLICATIONS

Singaporean Written Opinion and Search Report dated Jan. 11, 2016.
(Continued)

*Primary Examiner* — Saba Tsegaye
(74) *Attorney, Agent, or Firm* — McGinn IP Law Group, PLLC

(57) ABSTRACT

A communication system includes a control apparatus that controls communication apparatus(s) included in a hierarchical network, and a first communication apparatus that forms links in a first layer of the network and performs processing related to communication flows based on a first packet handling operation. The control apparatus determines destinations to accommodate communication flows specified according to the first packet handling operation, based on information related to a second layer that differs from the first layer.

15 Claims, 32 Drawing Sheets

(51) Int. Cl.
*H04L 12/715* (2013.01)
*H04L 12/803* (2013.01)
*H04L 12/911* (2013.01)
*H04L 12/58* (2006.01)
*H04Q 11/00* (2006.01)

(52) U.S. Cl.
CPC .......... *H04L 47/781* (2013.01); *H04L 47/825* (2013.01); *H04L 51/08* (2013.01); *H04Q 11/0062* (2013.01); *H04Q 2011/0064* (2013.01)

(56) References Cited

U.S. PATENT DOCUMENTS

| | | | |
|---|---|---|---|
| 9,319,337 B2* | 4/2016 | Koponen | G05B 11/01 |
| 2006/0126642 A1 | 6/2006 | Kojima et al. | |
| 2006/0209785 A1 | 9/2006 | Iovanna et al. | |
| 2008/0002664 A1 | 1/2008 | Li et al. | |
| 2008/0219268 A1* | 9/2008 | Dennison | H04L 12/4625 370/395.2 |
| 2010/0158035 A1 | 6/2010 | Kim et al. | |
| 2011/0261825 A1 | 10/2011 | Ichino | |
| 2011/0286324 A1* | 11/2011 | Bellagamba | H04L 41/0677 370/219 |
| 2011/0307628 A1 | 12/2011 | Chiba | |
| 2012/0314605 A1* | 12/2012 | Akiyoshi | H04L 45/30 370/252 |

FOREIGN PATENT DOCUMENTS

| | | |
|---|---|---|
| JP | 2010-148096 A | 7/2010 |
| JP | 2012-049674 A | 3/2012 |
| WO | WO 2004/071033 A1 | 8/2004 |

OTHER PUBLICATIONS

Korean Office Action dated May 19, 2016 with a Japanese and English translation thereof.
Korean Office Action dated Nov. 18, 2016 with a Japanese translation and partial English translation thereof.
Hideyuki Shimonishi, et al., "Programmable Network Using OpenFlow for Network Researches and Experiments", International Conference on Mobile Computing and Ubiquitous Networking (ICMU), May 2012.
International Search Report (ISR) (PCT Form PCT/ISA/210), in PCT/JP2013/076823, dated Jan. 7, 2014.
Nick McKeown, et. al., "OpenFlow: Enabling Innovation in Campus Networks," [online], [searched on May 31, 2012], the Internet <URL:http://www.openflow.org/documents/openflow-wp-latest.pdf>.
"OpenFlow Switch Specification" Version 1.1.0 Implemented (Wire Protocol 0x02), [online], [searched on May 31, 2012], the Internet <URL:http://www.openflow.org/documents/openflow-spec-v1.1.0.pdf>.
L. Liu, et al: "Experimental Validation and Performance Evaluation of Open Flow-Based Wavelength Path Control in Transparent Optical Networks", Dec. 19, 2011 (Dec. 19, 2011), Retrieved from the Internet: URL: https://www.osapublishing.org/view_article.cfm?gotourl=https%3A%2F%2Fwww.osapublishing.org%2FDirectPDFAccess%2FCE8716FBE509-B308-6D27F3DF065E341 C_225848%2Foe-19-27-26578.pdf%3Fda%3D1%26id%03D225848%26seq%3D0%26mobile%3Dno&org=[retrieved on Apr. 19, 2016].
Dongxu Zhang, et al: "Experimental Demonstration of OBS/WSON Multi-layer Optical Switched Networks with an Open Flow-based Unified Control Plane", Optical Network Design and Modeling (ONDM), 2012 16th International Conference on, IEEE, Apr. 17, 2012 (Apr. 17, 2012), pp. 1-6, XP032448926.
Oki E et al: "Dynamic Multilayer Routing Schemes in GMPLS-based IP +Optical Networks", IEEE Communications Magazine, IEEE Service Center, Piscataway, US, vol. 43, No. 1, Jan. 1, 2005 (Jan 1, 2005), pp. 108-114, XP011201253.
King (ED) Old Dog Consulting A Farrel (ED) Old Dog Consulting D: "The Application of the Path Computation Element Architecture to the Determination of a Sequence of Domains in MPLS and GMPLS; draft-ietf-pce-hierarchy-fwk-05.txt", The Application of the Path Computation Element Architecture to the Determination of a Sequence of Domains in MPLS and GMPLS; Draft-IETF-PCE-Hierarchy-FWK-05.Txt, Internet Engineering Task Force, IETF; Standardworkingdraft, Internet Society (ISOC) 4., Aug. 29, 2012 (Aug. 29, 2012), pp. 1-31, XP015087032.
Japanese Office Action dated Nov. 28, 2017 in Japanese Application No. 2014-539784 with an English translation thereof.
Eiichi Horiuchi, et al., "Network Control, Operations and Management for Photonic Networks", Proceedings of Workshop of the Institute of Electronics, Information and Communication Engineers, Mar. 5, 2012, the 111st volume, No. 475, p. 61 to 66.

* cited by examiner

FIG. 5

| MATCH FIELD | EXPIRY CONDITION | INSTRUCTIONS | COUNTERS |
|---|---|---|---|
| TRANSMISSION SOURCE IP ADDRESS = A1<br>DESTINATION IP ADDRESS = A2<br>OTHER FIELDS: WILDCARD | TIME T1 | FORWARD FROM PORT DIRECTED TOWARD PTN 50-1 | aaa |
| TRANSMISSION SOURCE IP ADDRESS = B1<br>DESTINATION IP ADDRESS = B2<br>OTHER FIELDS: WILDCARD | TIME T2 | FORWARD FROM PORT DIRECTED TOWARD PTN 50-3 | bbb |
| ... | ... | ... | ... |

FIG. 7

| MATCH FIELD | EXPIRY CONDITION | INSTRUCTIONS | COUNTERS |
|---|---|---|---|
| TRANSMISSION SOURCE IP ADDRESS = A1<br>DESTINATION IP ADDRESS = A2<br>OTHER FIELDS: WILDCARD | TIME T1 | USE PSEUDO LINE 1 | aaa |
| TRANSMISSION SOURCE IP ADDRESS = C1<br>DESTINATION IP ADDRESS = C2<br>OTHER FIELDS: WILDCARD | TIME T2 | USE PSEUDO LINE 2 | bbb |
| ... | ... | ... | ... |

FIG. 9

| OFS | LOGICAL PATH CONNECTION DESTINATION | PORT CONNECTION DESTINATION |
|---|---|---|
| OFS10-1 | OFS10-2 | PTN50-1/PTN50-3 |
| | OFS10-3 | PTN_X1/PTN_X2 |
| . . . | . . . | . . . |

FIG. 10

| PTN | PORT CONNECTION DESTINATION | SELECTABLE PSEUDO LINE |
|---|---|---|
| PTN50-1 | PTN50-2 | PSEUDO LINE 1-1 TO PSEUDO LINE 1-3 |
| PTN50-3 | PTN50-4 | PSEUDO LINE 2-1 TO PSEUDO LINE 2-2 |
| . . . | . . . | . . . |

FIG. 11

| FLOW ID | LOGICAL PATH | PSEUDO LINE |
|---|---|---|
| ID1 | OFS10-1,OFS10-2 | PSEUDO LINE 1-1 (PTN1, PTN2) |
| ID2 | OFS10-1,OFS10-2 | PSEUDO LINE 1-1 (PTN1, PTN2) |
| ID3 | OFS10-1,OFS10-2 | PSEUDO LINE 1-1 (PTN1, PTN2) |
| ID4 | OFS10-1,OFS10-2 | PSEUDO LINE 1-2 (PTN1, PTN2) |
| ID5 | OFS10-1,OFS10-2 | PSEUDO LINE 1-2 (PTN1, PTN2) |
| ID6 | OFS10-1,OFS10-2 | PSEUDO LINE 1-3 (PTN1, PTN2) |
| ID7 | OFS10-1,OFS10-2 | PSEUDO LINE 1-3 (PTN1, PTN2) |
| ID8 | OFS10-1,OFS10-2 | PSEUDO LINE 2-1 (PTN3, PTN4) |
| ID9 | OFS10-1,OFS10-2 | PSEUDO LINE 2-1 (PTN3, PTN4) |
| ID10 | OFS10-1,OFS10-2 | PSEUDO LINE 2-2 (PTN3, PTN4) |
| ID11 | OFS10-1,OFS10-3 | PSEUDO LINE X1 |
| ID12 | OFS10-1,OFS10-3 | PSEUDO LINE X2 |

FIG. 14

|  | TOTAL NUMBER OF TCP/IP FLOWS |
|---|---|
| PSEUDO LINE 1-1 | 3 |
| PSEUDO LINE 1-2 | 2 |
| PSEUDO LINE 1-3 | 2 |
| PSEUDO LINE 2-1 | 2 |
| PSEUDO LINE 2-2 | 1 |

FIG. 15

| FLOW ID | LOGICAL PATH | PSEUDO LINE |
|---|---|---|
| ID1 | OFS10-1,OFS10-2 | PSEUDO LINE 1-1 (PTN1, PTN2) |
| ID2 | OFS10-1,OFS10-2 | PSEUDO LINE 1-1 (PTN1, PTN2) |
| ID3 | OFS10-1,OFS10-2 | PSEUDO LINE 1-1 (PTN1, PTN2) |
| ID4 | OFS10-1,OFS10-2 | PSEUDO LINE 1-2 (PTN1, PTN2) |
| ID5 | OFS10-1,OFS10-2 | PSEUDO LINE 1-2 (PTN1, PTN2) |
| ID6 | OFS10-1,OFS10-2 | PSEUDO LINE 1-3 (PTN1, PTN2) |
| ID7 | OFS10-1,OFS10-2 | PSEUDO LINE 1-3 (PTN1, PTN2) |
| ID8 | OFS10-1,OFS10-2 | PSEUDO LINE 2-1 (PTN3, PTN4) |
| ID9 | OFS10-1,OFS10-2 | PSEUDO LINE 2-1 (PTN3, PTN4) |
| ID10 | OFS10-1,OFS10-2 | PSEUDO LINE 2-2 (PTN3, PTN4) |
| ID11 | OFS10-1,OFS10-3 | PSEUDO LINE X1 |
| ID12 | OFS10-1,OFS10-3 | PSEUDO LINE X2 |
| ID13 | OFS10-1,OFS10-2 | PSEUDO LINE 2-2 (PTN3, PTN4) |

FIG. 18

| MATCH FIELD | EXPIRY CONDITION | INSTRUCTIONS | COUNTERS |
|---|---|---|---|
| TRANSMISSION SOURCE IP ADDRESS = A1<br>DESTINATION IP ADDRESS = A2<br>OTHER FIELDS: WILDCARD | TIME T1 | USE OPTICAL PATH 1 | aaa |
| TRANSMISSION SOURCE IP ADDRESS = D1<br>DESTINATION IP ADDRESS = D2<br>OTHER FIELDS: WILDCARD | TIME T2 | USE OPTICAL PATH 2 | bbb |
| ... | ... | ... | ... |

FIG. 19

|  | PORT CONNECTION DESTINATION | SELECTABLE OPTICAL PATH |
|---|---|---|
| OXC60-1 | OXC60-2 | OPTICAL PATH 1-1 TO OPTICAL PATH 1-3 |
| OXC60-3 | OXC60-4 | OPTICAL PATH 2-1 TO OPTICAL PATH 2-2 |

FIG. 20

| FLOW ID | LOGICAL PATH | PSEUDO LINE | OPTICAL PATH |
|---|---|---|---|
| ID21 | OFS10-1,OFS10-2 | PSEUDO LINE 1-1 (PTN1, PTN2) | OPTICAL PATH 1-1 |
| ID22 | OFS10-1,OFS10-2 | PSEUDO LINE 1-1 (PTN1, PTN2) | OPTICAL PATH 1-2 |
| ID23 | OFS10-1,OFS10-2 | PSEUDO LINE 1-1 (PTN1, PTN2) | OPTICAL PATH 1-3 |
| ID24 | OFS10-1,OFS10-2 | PSEUDO LINE 1-2 (PTN1, PTN2) | OPTICAL PATH 2-1 |
| ID25 | OFS10-1,OFS10-2 | PSEUDO LINE 1-2 (PTN1, PTN2) | OPTICAL PATH 2-2 |
| ID26 | OFS10-1,OFS10-2 | PSEUDO LINE 1-3 (PTN1, PTN2) | OPTICAL PATH 2-2 |
| ID27 | OFS10-1,OFS10-2 | PSEUDO LINE 1-3 (PTN1, PTN2) | OPTICAL PATH 2-2 |
| ID28 | OFS10-1,OFS10-2 | PSEUDO LINE 2-1 (PTN3, PTN4) | OPTICAL PATH 2-1 |
| ID29 | OFS10-1,OFS10-2 | PSEUDO LINE 2-1 (PTN3, PTN4) | OPTICAL PATH 1-3 |
| ID30 | OFS10-1,OFS10-2 | PSEUDO LINE 2-2 (PTN3, PTN4) | OPTICAL PATH 1-2 |
| ID31 | OFS10-1,OFS10-3 | PSEUDO LINE X1 | OPTICAL PATH X1 |
| ID32 | OFS10-1,OFS10-3 | PSEUDO LINE X2 | OPTICAL PATH X2 |

FIG. 22

|  | TOTAL NUMBER OF TCP/IP FLOWS |
|---|---|
| OPTICAL PATH 1-1 | 1 |
| OPTICAL PATH 1-2 | 2 |
| OPTICAL PATH 1-3 | 2 |
| OPTICAL PATH 2-1 | 2 |
| OPTICAL PATH 2-2 | 3 |

FIG. 23

| FLOW ID | LOGICAL PATH | PSEUDO LINE | OPTICAL PATH |
|---|---|---|---|
| ID21 | OFS10-1,OFS10-2 | PSEUDO LINE 1-1 (PTN1, PTN2) | OPTICAL PATH 1-1 |
| ID22 | OFS10-1,OFS10-2 | PSEUDO LINE 1-1 (PTN1, PTN2) | OPTICAL PATH 1-2 |
| ID23 | OFS10-1,OFS10-2 | PSEUDO LINE 1-1 (PTN1, PTN2) | OPTICAL PATH 1-3 |
| ID24 | OFS10-1,OFS10-2 | PSEUDO LINE 1-2 (PTN1, PTN2) | OPTICAL PATH 2-1 |
| ID25 | OFS10-1,OFS10-2 | PSEUDO LINE 1-2 (PTN1, PTN2) | OPTICAL PATH 2-2 |
| ID26 | OFS10-1,OFS10-2 | PSEUDO LINE 1-3 (PTN1, PTN2) | OPTICAL PATH 2-2 |
| ID27 | OFS10-1,OFS10-2 | PSEUDO LINE 1-3 (PTN1, PTN2) | OPTICAL PATH 2-2 |
| ID28 | OFS10-1,OFS10-2 | PSEUDO LINE 2-1 (PTN3, PTN4) | OPTICAL PATH 2-1 |
| ID29 | OFS10-1,OFS10-2 | PSEUDO LINE 2-1 (PTN3, PTN4) | OPTICAL PATH 1-3 |
| ID30 | OFS10-1,OFS10-2 | PSEUDO LINE 2-2 (PTN3, PTN4) | OPTICAL PATH 1-2 |
| ID31 | OFS10-1,OFS10-3 | PSEUDO LINE X1 | OPTICAL PATH X1 |
| ID32 | OFS10-1,OFS10-3 | PSEUDO LINE X2 | OPTICAL PATH X2 |
| ID33 | OFS10-1,OFS10-3 | PSEUDO LINE 1-1 (PTN1, PTN2) | OPTICAL PATH 1-1 |

FIG. 25

| PSEUDO LINE | OPTICAL PATH |
|---|---|
| PSEUDO LINE 1 | OPTICAL PATH 1, OPTICAL PATH 4, OPTICAL PATH 7 |
| PSEUDO LINE 2 | OPTICAL PATH 2, OPTICAL PATH 5, OPTICAL PATH 7 |
| PSEUDO LINE 3 | OPTICAL PATH 3, OPTICAL PATH 6, OPTICAL PATH 8 |

FIG. 26

| FLOW ID | PSEUDO LINE | OPTICAL PATH 1 | OPTICAL PATH 2 | OPTICAL PATH 3 | OPTICAL PATH 4 | OPTICAL PATH 5 | OPTICAL PATH 6 | OPTICAL PATH 7 | OPTICAL PATH 8 |
|---|---|---|---|---|---|---|---|---|---|
| ID41 | PSEUDO LINE 1 | ○ | | | ○ | | | ○ | |
| ID42 | PSEUDO LINE 2 | | ○ | | | ○ | | ○ | |
| ID43 | PSEUDO LINE 3 | | | ○ | | | ○ | | ○ |

FIG. 28

| PSEUDO LINE | MAXIMUM VALUE | AVERAGE VALUE |
|---|---|---|
| PSEUDO LINE 1 | 2 | 1.3 |
| PSEUDO LINE 2 | 2 | 1.3 |
| PSEUDO LINE 3 | 1 | 1 |

FIG. 29

| FLOW ID | PSEUDO LINE | OPTICAL PATH 1 | OPTICAL PATH 2 | OPTICAL PATH 3 | OPTICAL PATH 4 | OPTICAL PATH 5 | OPTICAL PATH 6 | OPTICAL PATH 7 | OPTICAL PATH 8 |
|---|---|---|---|---|---|---|---|---|---|
| ID41 | PSEUDO LINE 1 | ○ | | | | | | ○ | |
| ID42 | PSEUDO LINE 2 | | ○ | | | ○ | | ○ | |
| ID43 | PSEUDO LINE 3 | | | ○ | | | ○ | | ○ |
| ID44 | PSEUDO LINE 3 | | | ○ | ○ | | ○ | | ○ |

FIG. 30

| PSEUDO LINE | MAXIMUM VALUE | AVERAGE VALUE |
|---|---|---|
| PSEUDO LINE 1 | 2 | 1.3 |
| PSEUDO LINE 2 | 2 | 1.3 |
| PSEUDO LINE 3 | 2 | 2 |

FIG. 31

| OPTICAL FIBER CABLE | X | W | R | P | C | ω |
|---|---|---|---|---|---|---|
| CABLE 1 | 1 | 1 | 1 | | 2 | 10 |
| CABLE 2 | 1 | 1 | 1 | 0.01 | 2 | 10 |
| CABLE 3 | 1 | 1 | 1 | 0.01 | 2 | 10 |
| CABLE 4 | 1 | 1 | 1 | 0.01 | 2 | 1 |
| CABLE 5 | 1 | 1 | 1 | 0.01 | 2 | 10 |
| CABLE 6 | 1 | 1 | 1 | 0.01 | 2 | 10 |
| CABLE 7 | 2 | 1 | 1 | 0.01 | 2 | 1 |
| CABLE 8 | 1 | 1 | 1 | 0.01 | 2 | 1 |

FIG. 32

| PSEUDO LINE | CABLE 1 | CABLE 2 | CABLE 3 | CABLE 4 | CABLE 5 | CABLE 6 | CABLE 7 | CABLE 8 | TOTAL |
|---|---|---|---|---|---|---|---|---|---|
| PSEUDO LINE 1 | 0.1 | | | 0.1 | | | 0.2 | | 0.4 |
| PSEUDO LINE 2 | | 0.1 | | | 0.1 | | 0.2 | | 0.4 |
| PSEUDO LINE 3 | | | 1 | | | 1 | | 1 | 3 |

United States Patent (patent document)

COMMUNICATION SYSTEM, CONTROL APPARATUS, CONTROL METHOD AND PROGRAM

REFERENCE TO RELATED APPLICATION

This application is based upon and claims the benefit of the priority of Japanese Patent Application No. 2012-221482 filed on Oct. 3, 2012, the disclosure of which is incorporated herein in its entirety by reference thereto.

TECHNICAL FIELD

The present invention relates to a communication system, a control apparatus, a control method and a program. In particular, the invention relates to a communication system, a control apparatus, a control method and a program, where a network is centrally controlled by the control apparatus.

BACKGROUND

In recent years, technology known as OpenFlow has been proposed (see Non Patent Literature (NPL) 1 and 2). In OpenFlow, communication is taken as end-to-end flow, and path control, failure recovery, load balancing, and optimization are performed on a per-flow basis. An OpenFlow switch as specified in Non Patent Literature 2 is provided with a secure channel for communication with an OpenFlow controller, and operates according to a flow table in which appropriate addition or rewriting is instructed by the OpenFlow controller. In the flow table, for each flow there are definitions of sets of match conditions (Match Fields) for collation with packet headers, flow statistical information (Counters), and instructions (Instructions) that define processing content (refer to "4.1 Flow Table" in Non Patent Literature 2).

For example, when an OpenFlow switch receives a packet, a search is made for an entry having a match condition (refer to "4.3 Match Fields" in Non Patent Literature 2) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Instructions field of the entry in question, for the received packet. On the other hand, as a result of the search, in a case where an entry matching the received packet is not found, the OpenFlow switch transmits a request for entry setting, to the OpenFlow controller via the secure channel, that is, a request (Packet-In message) to transmit control information for processing the received packet. The OpenFlow switch receives a flow entry determined by processing content and updates the flow table. In this way, the OpenFlow switch preforms packet forwarding using entries stored in the flow table as control information.

Patent Literature (PTL) 1 discloses an optical network system provided with optical path establishing means, and configured from a plurality of optical edge routers that connect an external IP network to an optical network, and a plurality of optical cross-connect devices provided with switching means for connecting between the optical edge routers by optical paths on an optical path basis.

[PTL 1]
International Publication No. WO2004/071033
[NPL 1]
Nick McKeown and seven other authors, "OpenFlow: Enabling Innovation in Campus Networks", [online], [Search performed on Jul. 13, 2012], Internet <URL: http://www.openflow.org/documents/openflow-wp-latest.pdf>
[NPL 2]
"OpenFlow Switch Specification" Version 1.1.0. Implemented (Wire Protocol 0x02), [online], [Searched performed on Jul. 13, 2012], Internet <URL:http://www.openflow.org/documents/openflow-spec-v1.1.0.pdf>

SUMMARY

It is to be noted that the respective disclosures of the abovementioned cited technical literature are incorporated herein by reference thereto. The following analysis is given according to the present invention.

In a centrally controlled network as represented by the OpenFlow network of Non Patent Literature 1 or 2, detailed control is possible. At this time, if a destination to accommodate communication flows received by a communication apparatus belonging to a specific layer (for example, a network layer) is determined without giving consideration to a packet forwarding state of a lower layer thereof (for example, a data link layer), there is a possibility of communication flows in the lower layer being unevenly distributed. In the lower layer, if the communication flows are unevenly distributed, while adequate bandwidth is secured for the specific communication flows, efficient operation of the network is obstructed due to adequate bandwidth not being secured for other communication flows and the like.

Therefore, it is an object of the present invention to provide a communication system, a control apparatus, a control method and a program, which contribute, in a centrally controlled network where control targets are expanded, to efficiently operating the overall network.

It is to be noted that, by providing functionality equivalent to an OpenFlow switch of Non Patent Literature 1 or 2, to an optical cross-connect device and optical edge router of Patent Literature 1, it is possible to build an optical IP network that may perform path control at a fine granularity level. However, Patent Literature 1 stops at disclosing technology for individual path control of an IP network and an optical network, and there is no disclosure of technology for realizing efficient operation of an overall network integrating both thereof.

According to a first aspect of the present invention there is provided: a communication system comprising: a control apparatus that controls communication apparatuses included in a hierarchical network, and a first communication apparatus that forms links in a first layer of the network and also performs processing related to communication flows based on a first processing rule (i.e., packet handling rule, termed herein as "packet handling operation"); wherein the control apparatus determines a destination to accommodate communication flows specified according to the first packet handling operation, based on information related to a second layer that differs from the first layer.

According to a second aspect of the present invention there is provided a control apparatus that determines a destination to accommodate communication flows via a first communication apparatus that forms links in a first layer of a hierarchical network, based on information related to a second layer that differs from the first layer.

According to a third aspect of the present invention there is provided a control method for a control apparatus that controls a communication apparatus included in a hierarchical network, the method comprising a step of determining a destination to accommodate communication flows via a first communication apparatus that forms links in a first layer of the network, based on information related to a second layer that differs from the first layer, and setting a first packet handling operation in accordance with the determined destination to accommodate communication flows, in the first communication apparatus. It is to be noted that this method is associated with a particular mechanism known as a control apparatus that controls communication apparatuses included in a hierarchical network.

According to a fourth aspect of the present invention there is provided a program to execute, on a computer comprising a control apparatus that controls a communication apparatus included in a hierarchical network, a process of determining a destination to accommodate communication flows via a first communication apparatus that forms links in a first layer of the network, based on information related to a second layer that differs from the first layer, and a process of setting a first packet handling operation in accordance with the determined destination to accommodate communication flows, in the first communication apparatus. It is to be noted that this program may be recorded on a computer-readable storage medium. The storage medium may be a non-transient storage medium such as a semiconductor memory, a hard disk, a magnetic recording medium, an optical recording medium or the like. The present invention may be embodied as a computer program product.

According to the respective aspects of the present invention, there is provided a communication system, a control apparatus, a control method and a program for the control apparatus, which contribute, in a centrally controlled network in which control targets are expanded, to efficiently operating the overall network.

BRIEF DESCRIPTION OF DRAWINGS

FIG. 5 is an example of a table set in a table DB 13 of the OpenFlow switch 10-1.

FIG. 7 is an example of a table set in a table DB 13 of a packet transport node 50-1.

FIG. 9 is a diagram showing an example in which properties related to the OpenFlow switch 10-1 are summarized.

FIG. 10 is a diagram showing an example of properties related to packet transport nodes 50-1 and 50-3.

FIG. 11 is a diagram showing an example of network paths contained in a network path DB 25.

FIG. 14 is a diagram summarizing the total number of TCP/IP flows accommodated in candidate pseudo lines.

FIG. 15 is a diagram reflecting a network path corresponding to a TCP/IP flow of ID13 with regard to FIG. 11.

FIG. 18 is an example of a table set in the table DB 13 of an optical cross-connect 60-1.

FIG. 19 is a diagram showing an example in which properties related to optical cross-connects 60-1 and 60-3 are summarized.

FIG. 20 is a diagram showing an example of network paths contained in a network path DB 25.

FIG. 21 is a flowchart showing an example of operations of a control apparatus 20a.

FIG. 22 is a diagram summarizing the total number of TCP/IP flows accommodated in candidate optical paths.

FIG. 23 is a diagram reflecting a network path corresponding to a TCP/IP flow of ID33 with respect to FIG. 20.

FIG. 25 is a diagram showing relationships of 3 pseudo lines and optical paths included in the respective pseudo lines.

FIG. 26 is a diagram showing an example of network paths accommodated in a network path DB 25.

FIG. 28 is a diagram summarizing maximum values and average values calculated for each pseudo line.

FIG. 29 is a diagram reflecting a network path corresponding to a TCP/IP flow of ID44 with respect to FIG. 26.

FIG. 30 is a diagram summarizing maximum values and average values calculated for each pseudo line.

FIG. 31 is a diagram showing an example of respective parameters for optical fiber cables configuring the network shown in FIG. 24.

FIG. 32 is a diagram summarizing bandwidth estimated values for each optical fiber cable used by the respective pseudo lines.

PREFERRED MODES

Figure 1:
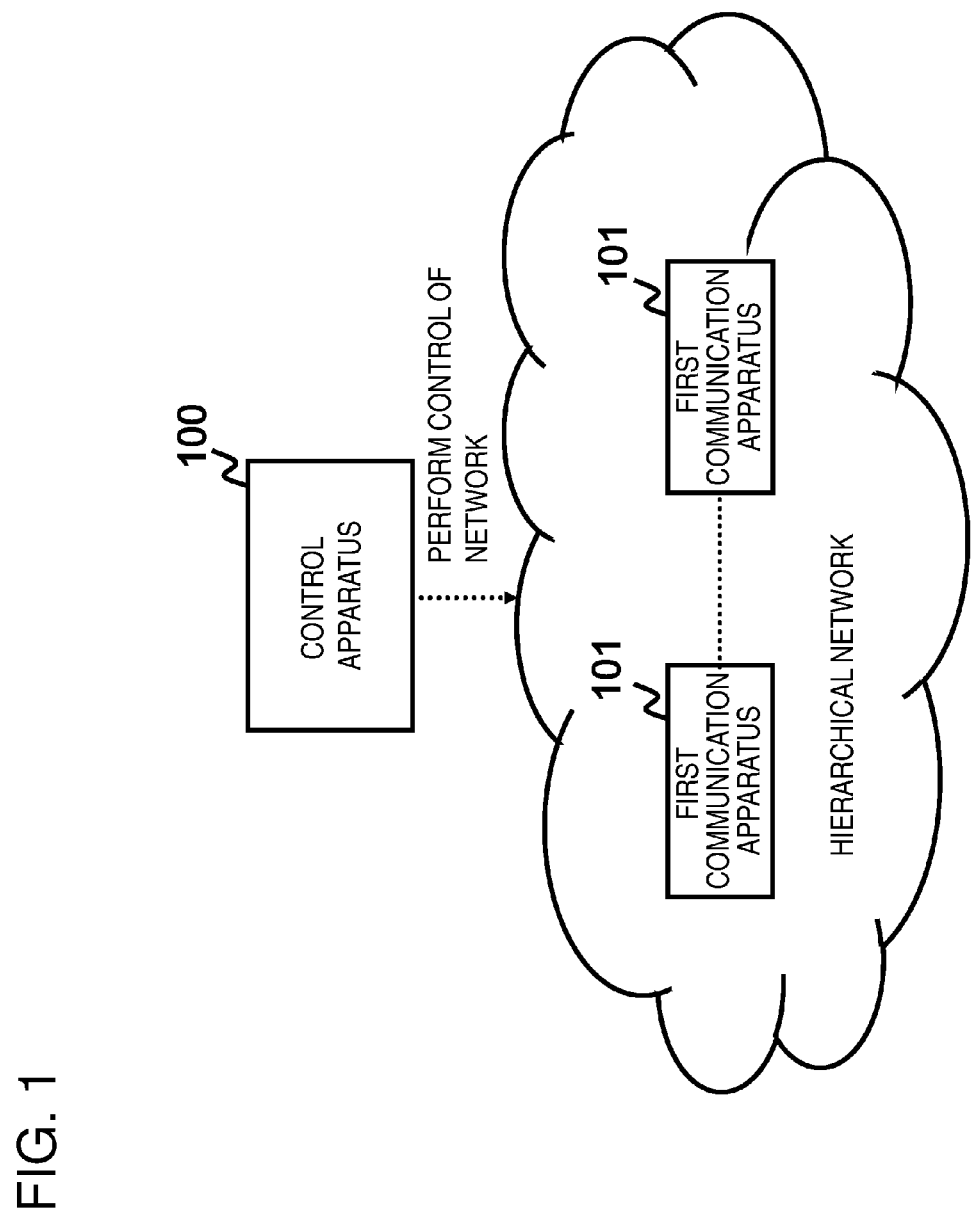
FIG. 1 is a diagram for describing an outline of an exemplary embodiment.

First, a description is given concerning an outline of an exemplary embodiment using FIG. 1. It is to be noted that reference symbols in the drawings attached to this outline are added to respective elements for convenience, as examples in order to aid understanding, and descriptions of the outline are not intended to limit the invention in any way.

As described above, in a centrally controlled network in which control targets are expanded, a communication system is desired that efficiently operates the overall network.

Thus, as an example, the communication system shown in FIG. 1 is provided. The communication system shown in FIG. 1 includes a control apparatus 100 that controls communication apparatuses included in a hierarchical network, and first communication apparatus 101 that form links in a first layer of the network and perform processing related to communication flows based on a first processing rule (i.e., packet handling operation). The control apparatus 100 determines destinations for accommodating communication flows specified according to the first packet handling operation, based on information related to a second layer that differs from the first layer.

The control apparatus 100 determines destinations for accommodating communication flows specified according to a packet handling operation set in a first communication apparatus 101, based on information related to the second layer. Here, if a destination to accommodate a communication flow received via the first communication apparatus 101 is determined without giving consideration to the second layer, there is a possibility of communication flows in the second layer being unevenly distributed. However, if a destination to accommodate communication flows is determined while using information related to the second layer, as in the control apparatus 100, it is possible to avoid uneven distribution of communication flows in the second layer. That is, the control apparatus 100 determines destinations for accommodating communication flows in an upper layer (for example, the first layer) so as to avoid duplication of communication flows in a lower layer (for example, the second layer) (in anticipation of a statistical multiplexing effect in the lower layer). As a result, it becomes possible to efficiently operate the network.

A more detailed description is given concerning specific exemplary embodiments below, making reference to the drawings.

First Exemplary Embodiment

A more detailed description is given concerning a first exemplary embodiment, using the drawings.

Figure 2:
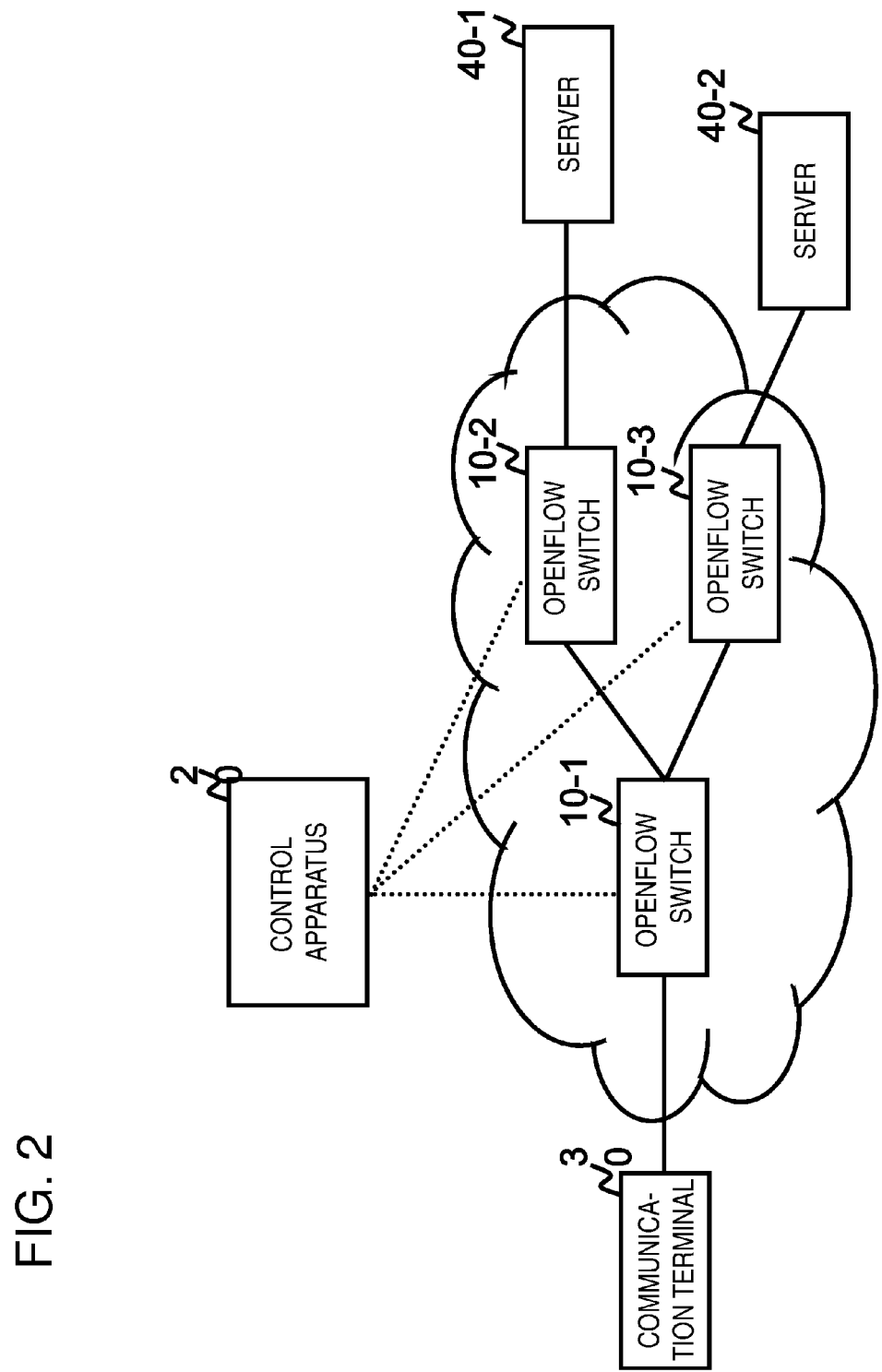
FIG. 2 is a diagram showing an example of a configuration of a communication system according to a first exemplary embodiment.

A description is given concerning the first exemplary embodiment, making reference to the drawings. FIG. 2 is a diagram showing an example of a configuration of a communication system according to the first exemplary embodiment. FIG. 2 shows a configuration that includes OpenFlow switches 10-1 to 10-3 (OFS 10-1 to OFS 10-3) that implement communication between a communication terminal 30 and servers 40-1 and 40-2, and a control apparatus 20 that controls these OpenFlow switches 10-1 to 10-3.

The control apparatus 20 sets packet processing rules (i.e., packet handling rules, termed herein as "packet handling operations") specifying processing for received packets, with respect to the OpenFlow switches 10-1 to 10-3. The OpenFlow switches 10-1 to 10-3 perform packet processing (packet forwarding) in accordance with the packet handling operations set by the control apparatus 20.

In a case where no packet handling operation exists that matches a match field of a received packet, the OpenFlow switch 10-1 makes an enquiry to the control apparatus 20 regarding processing for the received packet. The control apparatus 20 that receives the enquiry generates a packet handling operation for the received packet and makes a setting in the OpenFlow switch 10-1. Even in a case of there being no enquiry from the OpenFlow switch 10-1, the control apparatus 20 may generate a packet handling operation related to a certain packet. In this case, it is possible for the control apparatus 20 to spontaneously set a packet handling operation for the OpenFlow switch 10-1.

The configuration shown in FIG. 2 corresponds to connections on logical paths between the OpenFlow switches 10-1, 10-2 and 10-3. In other words, the connections in FIG. 2 indicate connection modes in a third layer (network layer). In the actual communication system, connections between respective OpenFlow switches are via a second layer (data link layer) and a first layer (physical layer).

Figure 3:
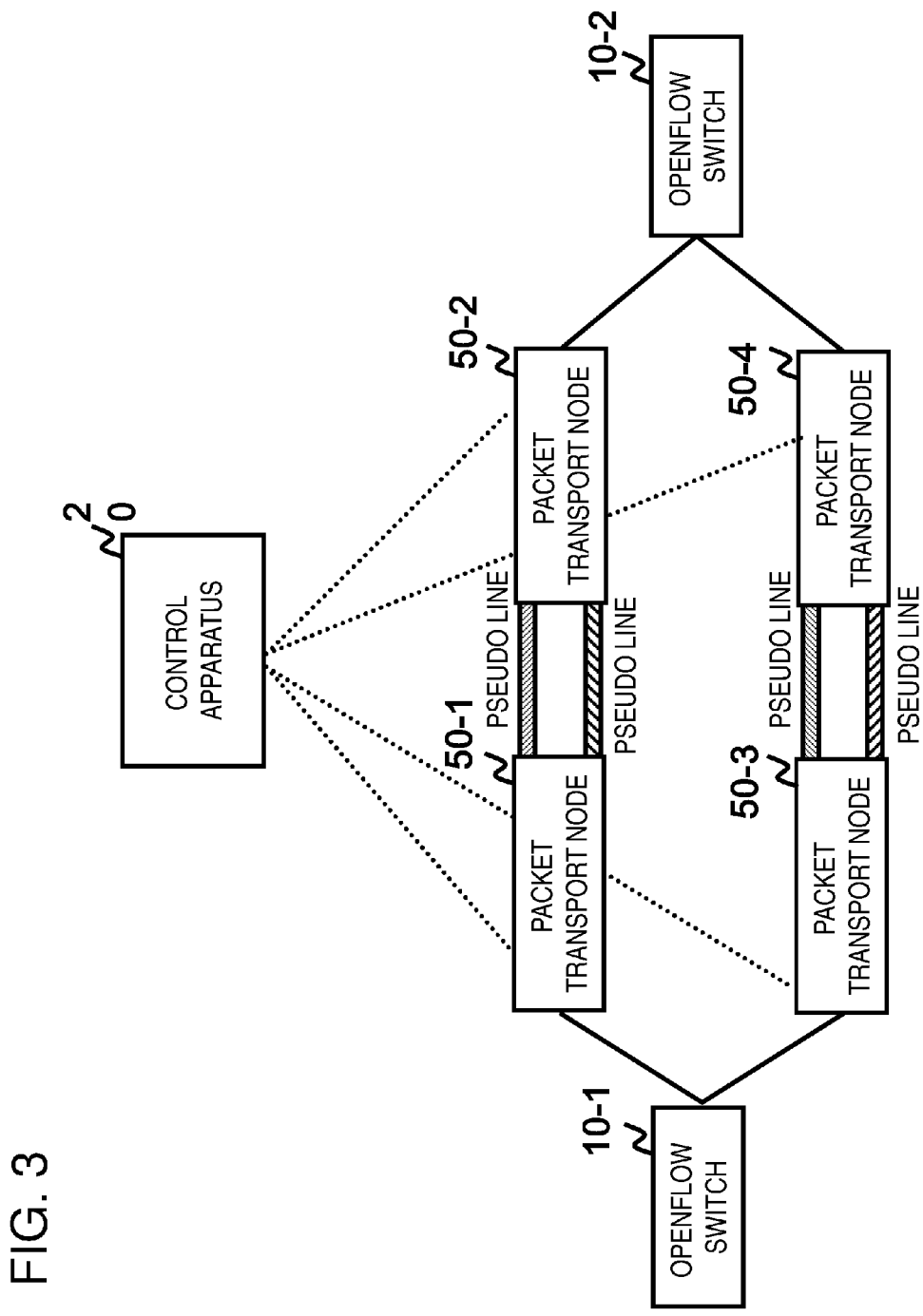
FIG. 3 is a diagram showing an example of a configuration of connections between OpenFlow switches 10-1 and 10-2 shown in FIG. 2.

FIG. 3 is a diagram showing an example of a configuration of connections between OpenFlow switches 10-1 and 10-2 shown in FIG. 2. FIG. 3 shows a configuration that includes packet transport nodes 50-1 to 50-4 (PTN 50-1 to PTN 50-4) that implement communication between OpenFlow switches 10-1 and 10-2. The OpenFlow switch 10-1 and the packet transport nodes 50-1 and 50-3 are connected via an Ethernet (registered trademark; the same applies below) cable or the like. Similarly, the OpenFlow switch 10-2 is connected to the packet transport nodes 50-2 and 50-4. The packet transport nodes 50-1 and 50-2 are connected using a transmission medium such as an Ethernet cable, an optical fiber cable, or the like. The packet transport nodes 50-3 and 50-4 are similarly connected.

Pseudo lines connecting the OpenFlow switches 10-1 and 10-2 are formed between the packet transport nodes. More specifically, pseudo lines are formed at the respective packet transport nodes by applying MPLS-TP (Multi Protocol Label Switching-Transport Profile) technology. At this time, at the packet transport nodes on a transmission side, received packets are encapsulated using MPLS labels when packets are forwarded. The packet transport nodes on the receiving side that receive the encapsulated received packets release the encapsulation of the packets (decapsulation) using MPLS labels.

In the example shown in FIG. 3, 2 pseudo lines are formed between the packet transport nodes 50-1 and 50-2. Similarly, 2 pseudo lines are formed between the packet transport nodes 50-3 and 50-4. It is to be noted that in order to facilitate understanding, FIG. 3 does not show connections between packet transport node 50-1 and packet transport node 50-4, and between packet transport node 50-3 and packet transport node 50-2. However, it is also possible to form pseudo lines between these packet transport nodes. Furthermore, the number of pseudo lines formed between the packet transport nodes is 2, but this is also an example and there is no limitation to the number of pseudo lines. In addition, pseudo lines are described here but it is possible also to have examples using logical lines, logical paths, lines, paths, or the like.

When the OpenFlow switch 10-1 forwards packets towards the OpenFlow switch 10-2, a selection is made either to forward the packets to the packet transport node 50-1, or to forward the packets to the packet transport node 50-3 (selection of port). The OpenFlow switch 10-2 receives packets from the packet transport nodes 50-2 or 50-4, and processes the packets in accordance with a packet handling operation.

In this way, the OpenFlow switches 10-1 and 10-2 are connected by a plurality of pseudo lines formed between a plurality of packet transport nodes.

The control apparatus 20 sets packet handling operations specifying processing when packets are received by respective packet transport nodes, with respect to the packet transport nodes 50-1 to 50-4. More specifically, the control apparatus 20 sets pseudo lines accommodating TCP/IP flows in response to TCP/IP flows received by the respective packet transport nodes. For example, a packet handling operation is set in the packet transport node 50-1, such as a certain TCP/IP flow being accommodated in pseudo line 1, and another TCP/IP flow being accommodated in pseudo line 2.

Determination of pseudo lines accommodating TCP/IP flows (assigning TCP flows) is implemented by specifying MPLS level when received packets are encapsulated. By specifying the MPLS level, it is possible to specify a specific pseudo line from among a plurality of pseudo lines formed between respective packet transport nodes. The packet transport nodes 50-1 to 50-4 perform packet processing (packet encapsulating) in accordance with packet handling operation(s) set by the control apparatus 20.

In a case where no packet handling operation exists that matches a match field of a received packet, the packet transport nodes 50-1 to 50-4 make an enquiry to the control apparatus 20 regarding processing for the received packet. The control apparatus 20 that receives the enquiry generates a packet handling operation for the received packet and makes a setting in the packet transport nodes 50-1 to 50-4.

As described above, in the communication system according to the present exemplary embodiment, OpenFlow switches and packet transport nodes are targets for control by the control apparatus 20.

Figure 4:
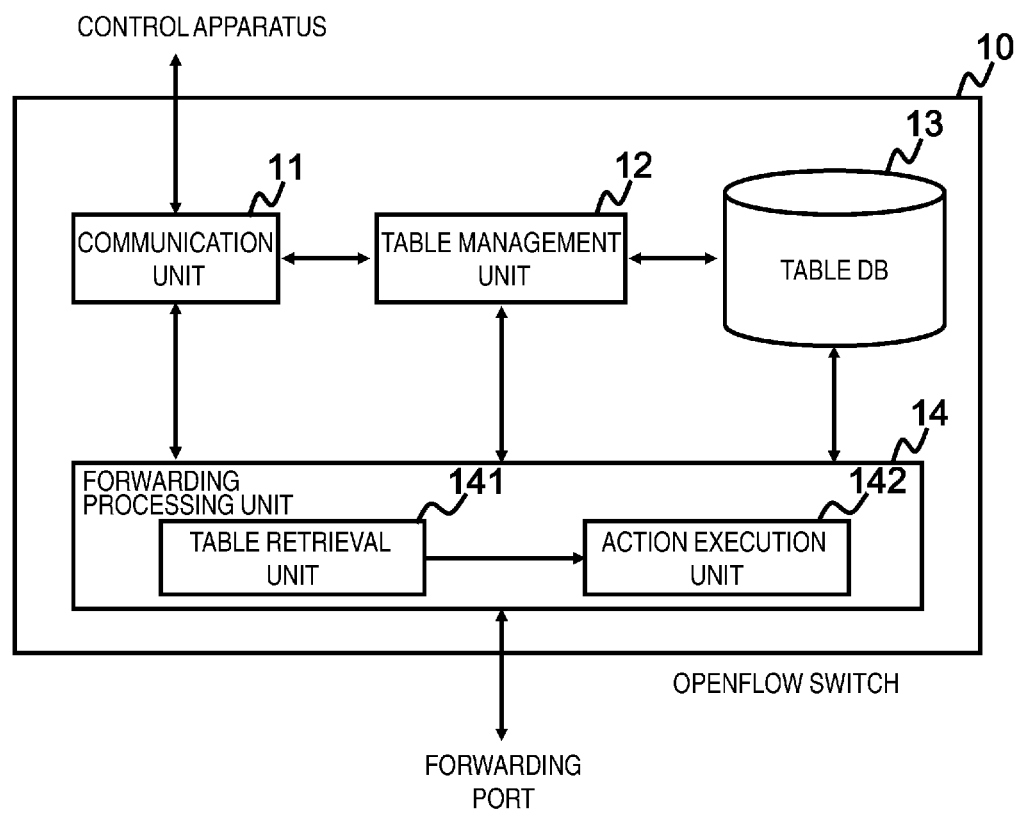
FIG. 4 is a diagram showing an example of an internal configuration of an OpenFlow switch 10.

FIG. 4 is a diagram showing an example of an internal configuration of the OpenFlow switches 10 (described as "OpenFlow switch 10" below, when there is no particular need to distinguish between OpenFlow switches 10-1 to 10-3).

The OpenFlow switch 10 is configured to include a communication unit 11, a table management unit 12, a table database (table DB) 13, and a forwarding processing unit 14.

The communication unit 11 is a means for implementing communication with the control apparatus 20 that sets packet handling operations in the OpenFlow switch 10. In the present exemplary embodiment, the communication unit 11 communicates with the control apparatus 20 using an OpenFlow protocol of Non Patent Literature 2. However, the communication protocol between the communication unit 11 and the control apparatus 20 is not limited to the OpenFlow protocol. In addition, the communication unit 11 notifies the control apparatus 20 of properties (number of connection ports, connection destination, IP address, MAC address, and the like) related to the OpenFlow switch 10, in accordance with a request from the control apparatus 20.

The table management unit 12 is a means for managing a table held by the table DB 13. More specifically, the table management unit 12 records packet handling operations instructed by the control apparatus 20 in the table DB 13, and when notified that a new packet has been received from the forwarding processing unit 14, requests the control apparatus 20 to set a packet handling operation. In a case where an expiry condition for a packet handling operation stored in respective tables is established, the table management unit 12 performs processing to delete or invalidate the packet handling operation.

The table DB 13 is configured by a database that can store 1 or more tables to be referred to, when the forwarding processing unit 14 performs processing of a received packet.

The forwarding processing unit 14 is configured to include a table retrieval unit 141 and an action execution unit 142. The table retrieval unit 141 is a means for retrieving a packet handling operation having a match field that matches a received packet, from a table stored in the table DB 13. The action execution unit 142 is a means for performing packet processing in accordance with processing connect indicated in an instruction field of the packet handling operation retrieved by the table retrieval unit 141. In a case where a packet handling operation having a match field matching a received packet is not found, the forwarding processing unit 14 notifies this to the table management unit 12. Furthermore, the forwarding processing unit 14 updates statistical information recorded in the table DB 13, in response to the packet processing.

FIG. 5 is an example of a table set in the table DB 13 of the OpenFlow switch 10-1. In the example of FIG. 5, a packet handling operation is set that implements forwarding of a TCP/IP flow received by the OpenFlow switch 10-1 to any of the packet transport nodes 50-1 to 50-3. For example, in a case of receiving a TCP/IP flow where A1 is set as a transmission source IP address and A2 is set as a destination IP address, the first processing from the top in FIG. 5 is executed. When the OpenFlow switch 10-1 receives this type of received packet (transmission source IP address=A1, destination IP address=A2), the table retrieval unit 141 of the OpenFlow switch 10-1 retrieves the first packet handling operation from the top of the table in FIG. 5, as a packet handling operation matching the received packet.

The action execution unit 142 of the OpenFlow switch 10-1 forwards the relevant received packet from a port connected to the packet transport node 50-1, in accordance with content shown in an instruction field thereof. Similarly, in a case of receiving a TCP/IP flow where B1 is set as a transmission source IP address and B2 is set as a destination IP address, the OpenFlow switch 10-1 forwards the relevant packet from a port connected to the packet transport node 50-3. It is to be noted that, in a case where no packet handling operation corresponding to the received packet exists, the OpenFlow switch 10 requests setting of a packet handling operation, with respect to the control apparatus 20.

In the example of FIG. 5, time T1 and time T2 are respectively set as "Time To Live" (TTL) in expiry conditions of respective packet handling operations. For example, in a case where the first packet handling operation from the top in FIG. 5 is not executed in time T1, the table management unit 12 performs an operation to delete the packet handling operation in question. The forwarding processing unit 14 initializes a timer that manages "Time To Live" whenever the respective packet handling operations are executed. Statistical information corresponding to the respective packet handling operations is updated whenever the relevant packet handling operation is executed. The packet handling operation as described above is similarly set in the OpenFlow switch 10-2 and the OpenFlow switch 10-3.

Figure 6:
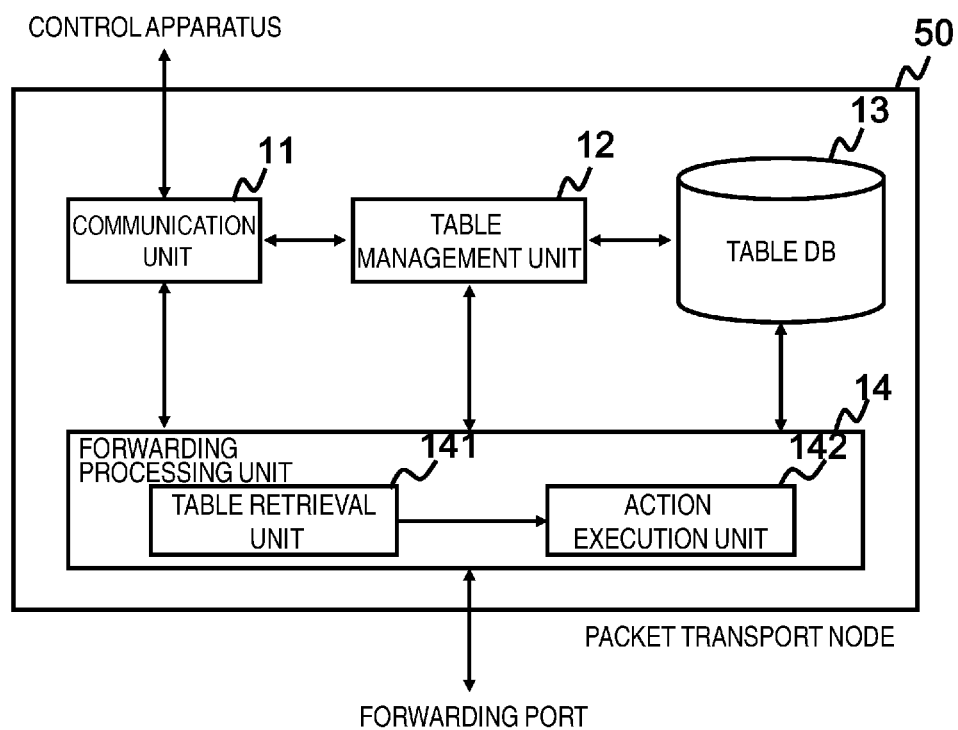
FIG. 6 is a diagram showing an example of an internal configuration of a packet transport node 50.

FIG. 6 is a diagram showing an example of an internal configuration of a packet transport node 50 (described as "packet transport node 50" below when there is no particular need to distinguish between the packet transport nodes 50-1 to 50-4). The main internal configuration of the packet transport node 50 matches the main internal configuration of the OpenFlow switch 10 shown in FIG. 4. Accordingly, a detailed description concerning the internal configuration of the packet transport node 50 is omitted.

A point of difference between the OpenFlow switch 10 and the packet transport node 50 is that packet handling operations recorded in the table DB 13 are different. With the packet handling operations recorded in the table DB 13 being different, contents of packet processing executed in accordance with the relevant packet handling operations by the action execution unit 142 also differ.

FIG. 7 is an example of a table set in the table DB 13 of the packet transport node 50-1. In the example of FIG. 7, a packet handling operation is set that implements forwarding of packets using a pseudo line 1 or a pseudo line 2 for TCP/IP flows received by the packet transport node 50-1. In a case of receiving a TCP/IP flow where A1 is set as a transmission source IP address and A2 is set as a destination IP address, the first processing from the top in FIG. 7 is executed. When the packet transport node 50-1 receives this type of received packet (transmission source IP address=A1, destination IP address=A2), the table retrieval unit 141 of the packet transport node 50-1 retrieves the first packet handling operation from the top of the table in FIG. 7, as a packet handling operation matching the received packet. The action execution unit 142 of the packet transport node 50-1 then performs packet processing (uses the pseudo line 1) in accordance with content shown in an instruction field thereof. More specifically, the action execution unit 142 of the packet transport node 50-1 encapsulates a received packet using an MPLS label corresponding to the pseudo line 1. The packet transport node 50-1 forwards packets after encapsulation to the packet transport node 50-2. Similarly, on receiving a packet with transmission source IP address=C1 and destination IP address=C2, the packet transport node 50-1 forwards the packet using the pseudo line 2. It is to be noted that, in a case where no packet handling operation corresponding to the received packet exists, the packet transport node 50 requests setting of a packet handling operation, with respect to the control apparatus 20. The "Time To Live" is set as an expiry condition, similar to the OpenFlow switch 10.

In this way, the packet transport node 50 selects a pseudo line when forwarding a received packet, in accordance with a packet handling operation set by the control apparatus 20. In order words, the control apparatus 20 determines a pseudo line accommodating the relevant TCP/IP flow, for each TCP/IP flow received by the packet transport node 50.

Figure 8:
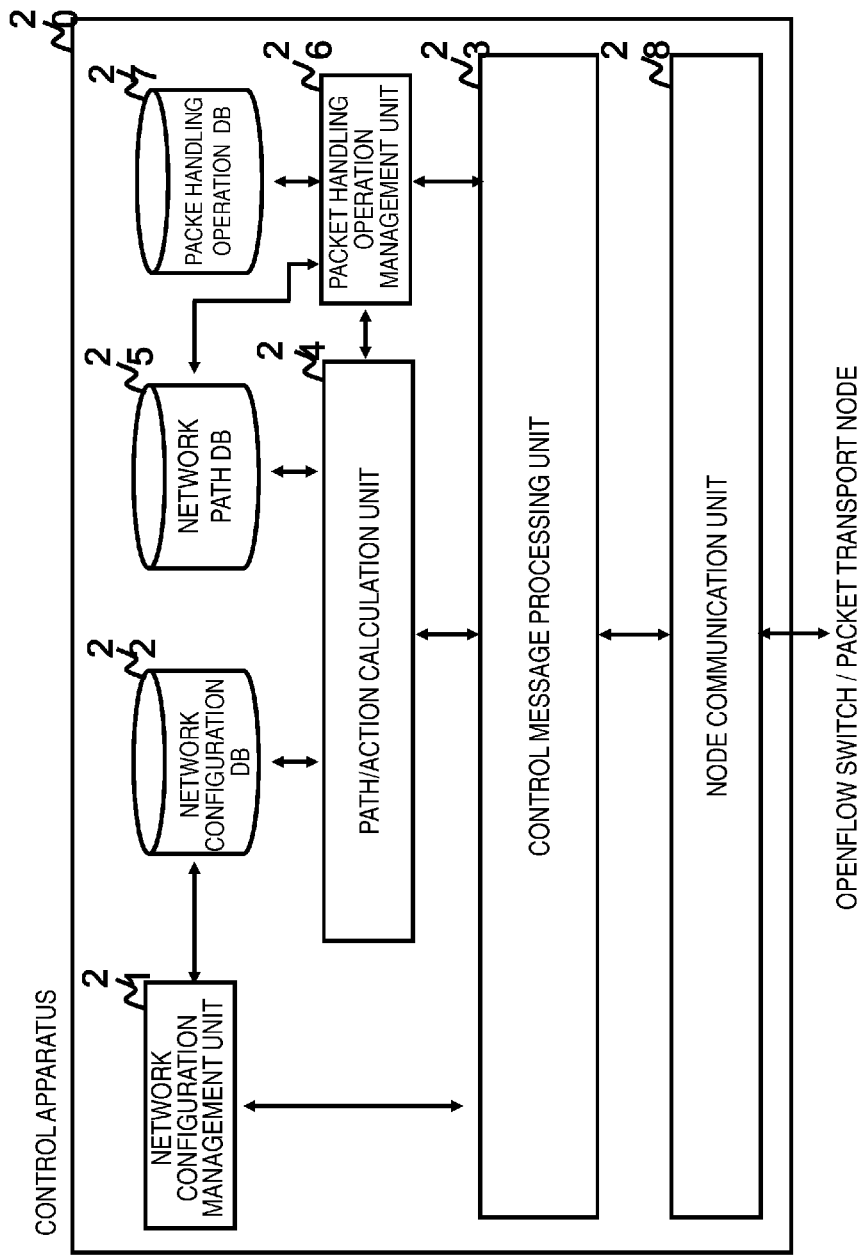
FIG. 8 is an example of a block diagram representing a configuration example of a control apparatus 20.

FIG. 8 is an example of a block diagram reflecting a configuration example of the control apparatus 20. The control apparatus 20 is configured to include: a network configuration management unit 21, a network configuration database (network configuration DB) 22, a control message processing unit 23, a path/action calculation unit 24, a network path database (network path DB) 25, a packet handling operation management unit 26, a packet handling operation database (packet handling operation DB) 27, and a node communication unit 28 that performs communication with the OpenFlow switch 10 and the packet transport node 50.

The network configuration management unit 21 manages network configuration of the communication system by consolidating properties of nodes (OpenFlow switch 10 and packet transport node 50) included in the communication system, which are control targets of the control apparatus 20, via the node communication unit 28. More specifically, transmission requests related to respective properties are made to the OpenFlow switch 10 and the packet transport node 50 when the control apparatus 20 is initially started up (booted), or periodically. The OpenFlow switch 10 or the like that receives the request responds with its own properties to the control apparatus 20. The network configuration management unit 21 summarizes these responses and records them in the network configuration DB 22.

FIG. 9 is a diagram showing an example in which properties related to the OpenFlow switch 10-1 are summarized. It may be understood from FIG. 9 that connection destinations of the OpenFlow switch 10-1 are the OpenFlow switches 10-2 and 10-3. There are 2 ports existing that can be selected when forwarding a packet towards the Open-Flow switch 10-2, and they are respectively connected to the packet transport nodes 50-1 and 50-3. The network configuration management unit 21 summarizes such information to be recorded in the network configuration DB 22.

FIG. 10 is a diagram showing an example of properties related to packet transport nodes 50-1 and 50-3. From FIG. 10 it may be understood that a port of the packet transport node 50-1 is connected to the packet transport node 50-2. Similarly, a port of the packet transport node 50-3 is connected to the packet transport node 50-4. It is understood that there are 3 lines, pseudo lines 1-1 to 1-3, that can be formed between the packet transport node 50-1 and the packet transport node 50-2. Furthermore, there are 2 lines, pseudo lines 2-1 to 2-2, which can be formed between the packet transport node 50-3 and the packet transport node 50-4. It is to be noted that the number of pseudo lines that can be formed between the packet transport nodes shown in FIG. 10 is exemplary, and there is no limitation with regard to the number of lines shown in FIG. 10.

The network configuration management unit 21 summarizes such information to be recorded in the network configuration DB 22.

The control message processing unit 23 analyzes control messages received from the OpenFlow switch 10 or the packet transport node 50, and delivers the control message information to a relevant processing means within the control apparatus 20.

The path/action calculation unit 24 calculates a network path for each TCP/IP flow based on the network configuration stored in the network configuration DB 22 and the network paths stored in the packet handling operation DB 27. More specifically, the path/action calculation unit 24 determines the forwarding path of received packets in the OpenFlow switch 10. Or, the path/action calculation unit 24 determines pseudo lines used when received packets are forwarded in the packet transport node 50.

The path/action calculation unit 24 records the calculated network path in the network path DB 25. The path/action calculation unit 24 delivers the calculated network path to the packet handling operation management unit 26.

FIG. 11 is a diagram showing an example of network paths stored in the network path DB 25. It is to be noted that in the following description and drawings, TCP/IP flows are distinguished by flow ID. TCP/IP flows with different flow IDs have different combinations of transmission source IP addresses and destination IP addresses.

Referring to FIG. 11, TCP/IP flows with flow IDs of ID1 to ID10 are forwarded by logical paths from OpenFlow switch 10-1 to OpenFlow switch 10-2. Meanwhile, TCP/IP flows with flow IDs of ID11 to ID12 are forwarded by logical paths from OpenFlow switch 10-1 to OpenFlow switch 10-3. TCP/IP flows with ID1 to ID3 are accommodated in pseudo line 1-1. TCP/IP flows with ID4 and ID5 are accommodated in pseudo line 1-2. TCP/IP flows with ID6 and ID7 are accommodated in pseudo line 1-3. TCP/IP flows with ID8 and ID9 are accommodated in pseudo line 2-1. A TCP/IP flow with ID10 is accommodated in pseudo line 2-2.

The path/action calculation unit 24 calculates a pseudo line and a logical path accommodating an unknown TCP/IP flow, based on the network configuration recorded in the network configuration DB 22 and the network paths recorded in the network path DB 25. The path/action calculation unit 24 functions also as a means for calculating an expiry condition for each packet handling operation and determining a value to be set in an expiry condition field of each packet handling operation. For example, the path/action calculation unit 24 determines "Time To Live" of packet handling operations corresponding to respective TCP/IP flows, in the OpenFlow switch 10 or the packet transport node 50. It is to be noted that a predetermined value can be used in determining "Time To Live" for a packet handling operation. Or, information of transmission source IP address, destination IP address, port number or the like may be used to individually set "Time To Live" in packet handling operations.

The packet handling operation management unit 26 manages packet handling operations set in the OpenFlow switch 10 and the packet transport node 50. Specially, packet handling operations to be set in the OpenFlow switch 10 and the packet transport node 50 are generated based on the network path calculated in the path/action calculation unit 24, and the packet handling operations of each thereof are recorded in the packet handling operation DB 27. In a case where a change occurs in a packet handling operation set in the OpenFlow switch 10, due to a packet handling operation delete notification from the OpenFlow switch 10 or the like, corresponding content of the packet handling operation DB 27 is changed.

The packet handling operation DB 27 stores packet handling operations to be set in the OpenFlow switch 10 and the packet transport node 50.

It is to be noted that the respective units (processing means) of the OpenFlow switch 10 and the packet transport node 50 shown in FIG. 4 and FIG. 6, and the control apparatus 20 shown in FIG. 8 can be implemented by a computer program that executes the respective processing to be described below, on a computer configuring these devices, using hardware thereof.

Figure 12:
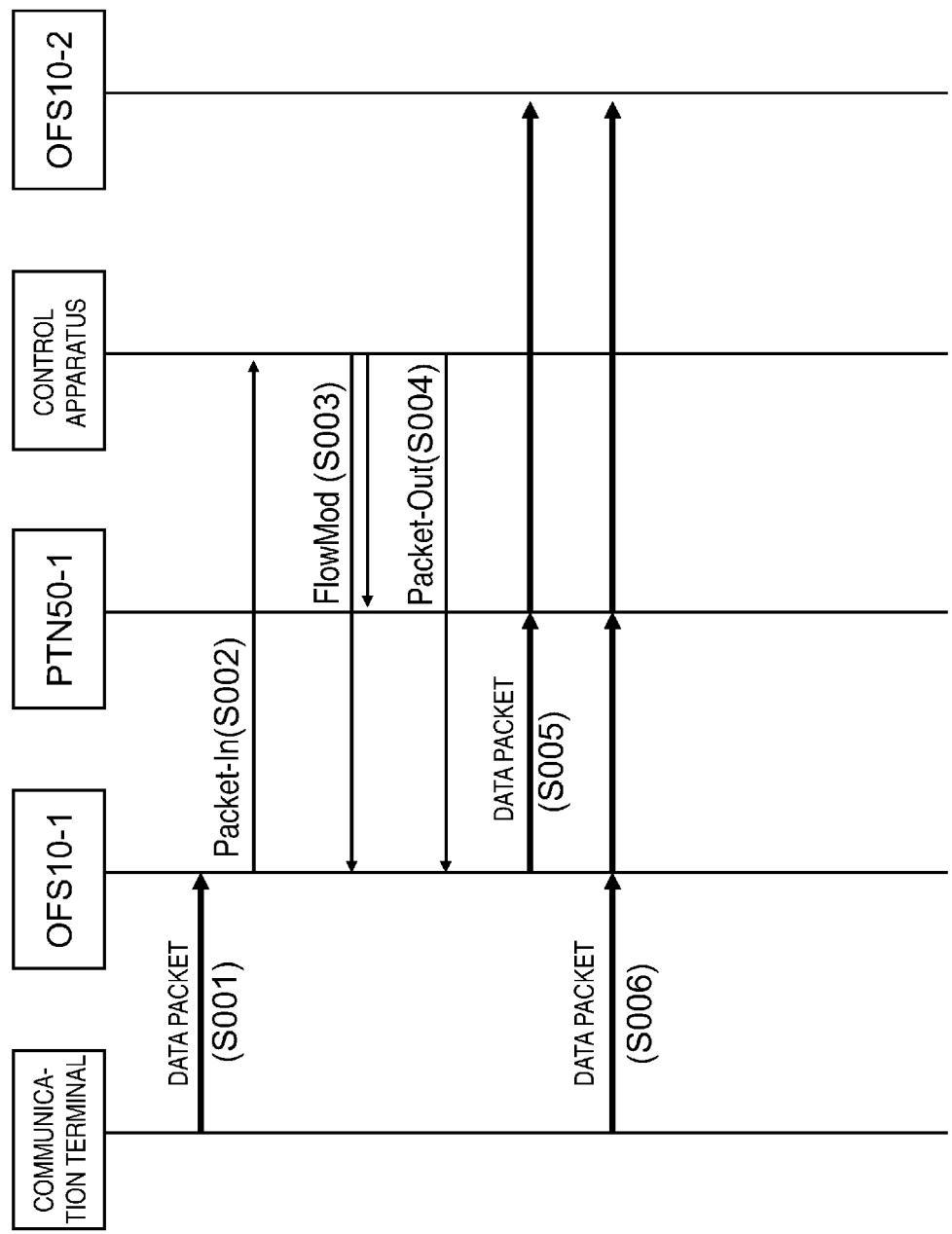
FIG. 12 is a sequence diagram for describing operations of the communication system according to the first exemplary embodiment.

Next, a description is given concerning operations of the present exemplary embodiment, making reference to the drawings. It is to be noted that FIG. 12 is exemplary and operations of the communication system according to the present exemplary embodiment are not limited to a sequence of FIG. 12. FIG. 12 is a sequence diagram for describing operations of the communication system according to the first exemplary embodiment. In the description below, network paths shown in FIG. 11 are recorded in the network path DB 25 of the control apparatus 20. Furthermore, properties concerning the OpenFlow switch 10-1 relate to content shown in FIG. 9, and properties concerning the packet transport nodes 50-1 and 50-3 relate to content shown in FIG. 10.

In this type of situation, the OpenFlow switch 10-1 receives an unknown TCP/IP flow from a communication terminal 30 (step S001 in FIG. 12). It is to be noted that the flow ID of the TCP/IP flow in question is ID13.

In the OpenFlow switch 10-1 that receives a packet corresponding to the TCP/IP flow in question, a search is made for a packet handling operation having a match field that conforms with the received packet, from the table, but such a packet handling operation is not found. Accordingly, the OpenFlow switch 10-1 requests the control apparatus 20 to set a packet handling operation accompanying the received packet (step S002 in FIG. 12; Packet-In).

The control apparatus 20 that receives the request calculates a network path to accommodate a TCP/IP flow having a flow ID of ID13, and generates a packet handling operation to be set in the OpenFlow switch and the packet transport node. The network path for the TCP/IP flow with ID13 is calculated using a logical path between the OpenFlow switches 10-1 and 10-2, and also a pseudo line 2-2, and the relevant packet handling operation is generated. Note that details are described below concerning calculation of the network path and generation of the packet handling operation in the control apparatus 20.

The control apparatus 20 that generates the packet handling operation sets the packet handling operation in the OpenFlow switch 10-1 and the packet transport node 50-3 (step S003 in FIG. 12; FlowMod). The control apparatus 20 returns the packet received in step S002 to the OpenFlow switch 10-1, and instructs that the packet in question be forwarded (step S004 in FIG. 12; Packet-Out).

Based on the instruction described above and the packet handling operation, the OpenFlow switch 10-1 forwards the received packet to the packet transport node 50-3 (step S005 in FIG. 12). The packet transport node 50-3 that receives the packet forwarded from the OpenFlow switch 10-1 accommodates the TCP/IP flow with ID13 in the pseudo line 2-2, in accordance with the packet handling operation that has been set (step S005 in FIG. 12). The packet forwarded from the packet transport node 50-3 arrives at the OpenFlow switch 10-2, via the packet transport node 50-4.

After the packet handling operation corresponding to the TCP/IP flow with ID13 has been set, the OpenFlow switch 10-1 and the packet transport node 50-3 forward the packet corresponding to the TCP flow with ID13 to the OpenFlow switch 10-2, without making an enquiry to the control apparatus 20 (step S006 in FIG. 12).

Figure 13:
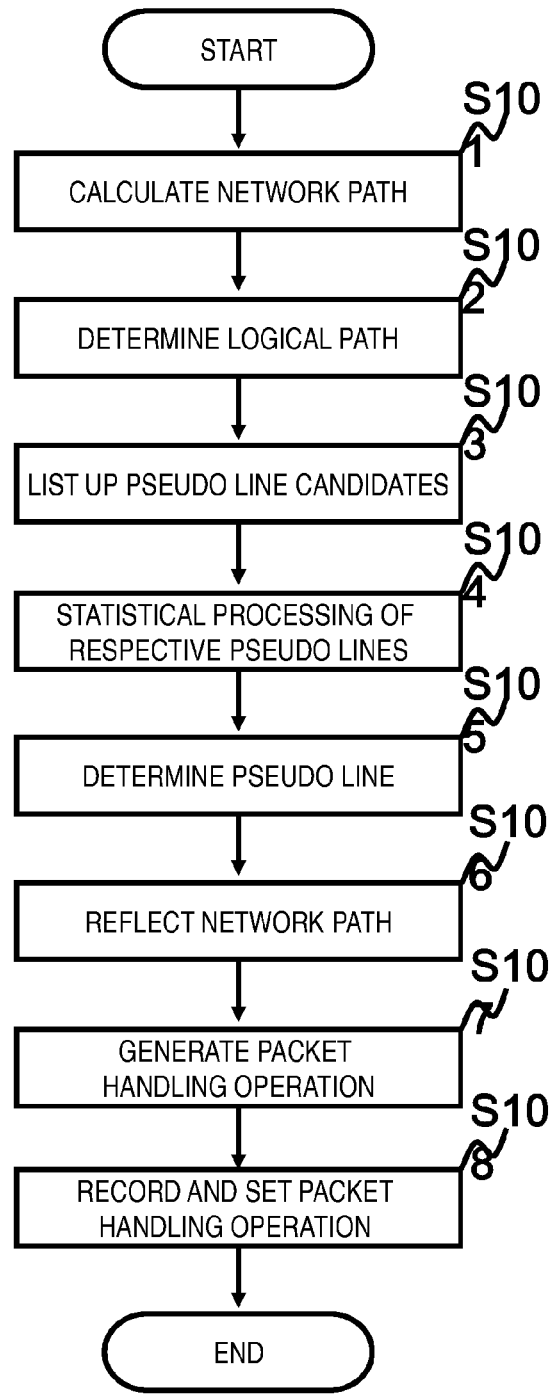
FIG. 13 is a flowchart showing an example of operations of the control apparatus 20.

Next, a description is given concerning calculation of the network path and setting of the packet handling operation in the control apparatus 20. FIG. 13 is a flowchart showing an example of operations of the control apparatus 20. It is to be noted that a description is given of calculation of the network path and setting of the packet handling operation, taking as an example the abovementioned calculation of the network path and setting of the packet handling operation related to the TCP/IP flow with ID13.

In step S101, the path/action calculation unit 24 is instructed to perform calculation of the network path for the TCP/IP flow with ID13, by the control message processing unit 23.

In step S102, the path/action calculation unit 24 decides whether to forward the packet to either the OpenFlow switch 10-2 or the OpenFlow switch 10-3 from the OpenFlow switch 10-1, from the destination address of the received packet. In the present step, a logical path to accommodate the TCP/IP flow with ID9 is determined. For example, in the decision at this time, the forwarding destination of the received packet is determined in accordance with a routing table possessed by the control apparatus 20. Here, a decision is made that the received packet described above is a packet that should be forwarded to the OpenFlow switch 10-2.

In step S103, the path/action calculation unit 24 lists up pseudo line candidates that can implement a logical path from the OpenFlow switch 10-1 to the OpenFlow switch 10-2. At this time, the path/action calculation unit 24 obtains properties concerning the OpenFlow switch 10-1 shown in FIG. 9, and properties concerning the packet transport nodes 50-1 and 50-3 shown in FIG. 10, from the network configuration DB 22. Referring to FIG. 9 and FIG. 10, there are 5 candidate pseudo lines: pseudo lines 1-1 to 1-3 formed between the packet transport nodes 50-1 and 50-2, and pseudo lines 2-1 to 2-2 formed between the packet transport nodes 50-3 and 50-4.

In step S104, the path/action calculation unit 24 performs statistical processing for each listed pseudo line. More specifically, the total number of TCP/IP flows accommodated in the respective pseudo lines is counted. Or, in the statistical processing performed by the path/action calculation unit 24, it is possible to perform any of: calculation of an average value of the TCP/IP flows accommodated in the respective pseudo lines, calculation of a moving average, calculation of a maximum or minimum value, or to use an arbitrary combination of these. At this time, the path/action calculation unit 24 uses the network path stored in the network path DB 25. For example, candidate pseudo lines are extracted from among the pseudo lines shown in FIG. 11 and the number of candidate pseudo lines is counted. FIG. 14 is a diagram summarizing the total of TCP/IP flows accommodated in the candidate pseudo lines.

In step S105, the path/action calculation unit 24 determines a pseudo line with the minimum number of TCP/IP flows accommodated in the candidate pseudo lines. In the example of FIG. 14, this corresponds to pseudo line 2-2. At a point in time when the present step ends, a pseudo line and a logical path accommodating the TCP/IP flow with ID13 are confirmed.

In step S106, the path/action calculation unit 24 reflects the confirmed TCP/IP flow with ID13, in a network path stored in the network path DB 25 (update of the network path DB 25). More specifically, a destination where the TCP/IP flow with ID13 is accommodated is confirmed as below.

Logical path; accommodated in a logical path from OpenFlow switch 10-1 to 10-2.

Pseudo line; accommodated in pseudo line 2-2.

The path/action calculation unit 24 records the confirmed network path in the network path DB 25. FIG. 15 is a diagram reflecting a network path corresponding to the TCP/IP flow with ID13, with respect to FIG. 11. The path/action calculation unit 24 delivers the confirmed network path to the packet handling operation management unit 26.

In step S107, the packet handling operation management unit 26 generates packet handling operations set in the OpenFlow switch 10-1 and the packet transport node 50-3, from the delivered network path. Here, since the pseudo line 2-2 is used as a network path, a packet handling operation is generated to forward a received packet corresponding to the TCP/IP flow with ID13 to a port directed towards the packet transport node 50-3, with regard to the OpenFlow switch 10-1. The packet handling operation management unit 26 generates a packet handling operation using the pseudo line 2-2, with regard to the packet transport node 50-3.

In step S108, the packet handling operation management unit 26 records the generated packet handling operation in the packet handling operation DB 27. The packet handling operation management unit 26 gives an instruction to set the generated packet handling operation to the OpenFlow switch 10-1 and the packet transport node 50-3, with respect to the control message processing unit 23. The description above concerns calculation of network paths and setting of packet handling operations in the control apparatus 20.

It is to be noted that the description given concerns a case where the control apparatus 20 according to the present exemplary embodiment sets packet handling operations in the OpenFlow switch 10 and the packet transport node 50. However, there may be a case of apparatus, and connection modes thereof, used in the communication system that is a control target of the control apparatus 20, where it is necessary to set a packet handling operation limited to either the OpenFlow switch 10 or the packet transport node 50. For example, in a case where the OpenFlow switch 10 is provided with 1 output port, with the exception of where a received packet or the like is dropped a packet handling operation is set to put a packet to the output port in question. In this case, assigning packets to each communication flow is implemented in the packet transport node 50. Or, in the present exemplary embodiment, a description is given of a case where the control apparatus 20 has a plurality of OpenFlow switches 10 or packet transport nodes 50 as control targets. However, according to the configuration of the network, there may be a case where a plurality of apparatuses that are targets for control by the control apparatus 20 do not exist.

In this way, in the communication system according to the present exemplary embodiment, when a destination to accommodate communication flows, as specified in a packet handling operation set in the OpenFlow switch 10, is decided, use is made of the number of pseudo lines, which is information concerning a layer (data link layer; second layer) different from a layer (network layer; third layer) to which the OpenFlow switch 10 belongs. As a result, an uneven distribution of pseudo lines accommodating TCP/IP flows does not occur, and it is possible to efficiently operate the overall communication system. For example, when pseudo lines accommodating a TCP/IP flow with ID13 as described above is determined, if consideration is not given to the total number of TCP/IP flows already accommodated in the pseudo lines, there is a possibility that pseudo lines formed between the packet transport nodes 50-1 and 50-2 will be used. There is a possibility that, in the OpenFlow switch 10-1, a forwarding port for a received packet may be determined as a port directed towards the packet transport node 50-1, rather than a port directed towards the packet transport node 50-3.

Here, 7 TCP/IP flows are accommodated in pseudo lines between the packet transport nodes 50-1 and 50-2, before the TCP/IP flow with ID13 is generated. Furthermore, 3 TCP/IP flows are accommodated in pseudo lines between the packet transport nodes 50-3 and 50-4 (refer to FIG. 11). In this type of situation, having the TCP/IP flow with ID13 accommodated in a pseudo line between the packet transport nodes 50-1 and 50-2 is unfavorable. That is, having the TCP/IP flow with ID13 accommodated in a pseudo line between the packet transport nodes 50-3 and 50-4 contributes to distribution of load and performance improvement (securing of bandwidth, having low delay, etc.) in the communication system. As described above, by expanding the targets of control by OpenFlow, it is possible to efficiently operate the overall communication system.

Second Exemplary Embodiment

Next, a detailed description is given concerning a second exemplary embodiment, making reference to the drawings.

In the communication system according to the present exemplary embodiment, in addition to an OpenFlow switch 10 and a packet transport node 50, optical cross-connects that connect between packet transport nodes with optical fiber cable are also objects for control by a control apparatus. Configurations between the OpenFlow switches and the packet transport nodes of the communication system according to the present exemplary embodiment are the same as the configurations shown in FIG. 2 and FIG. 3. Therefore, descriptions corresponding to FIG. 2 and FIG. 3 in the communication system according to the present exemplary embodiment are omitted.

Figure 16:
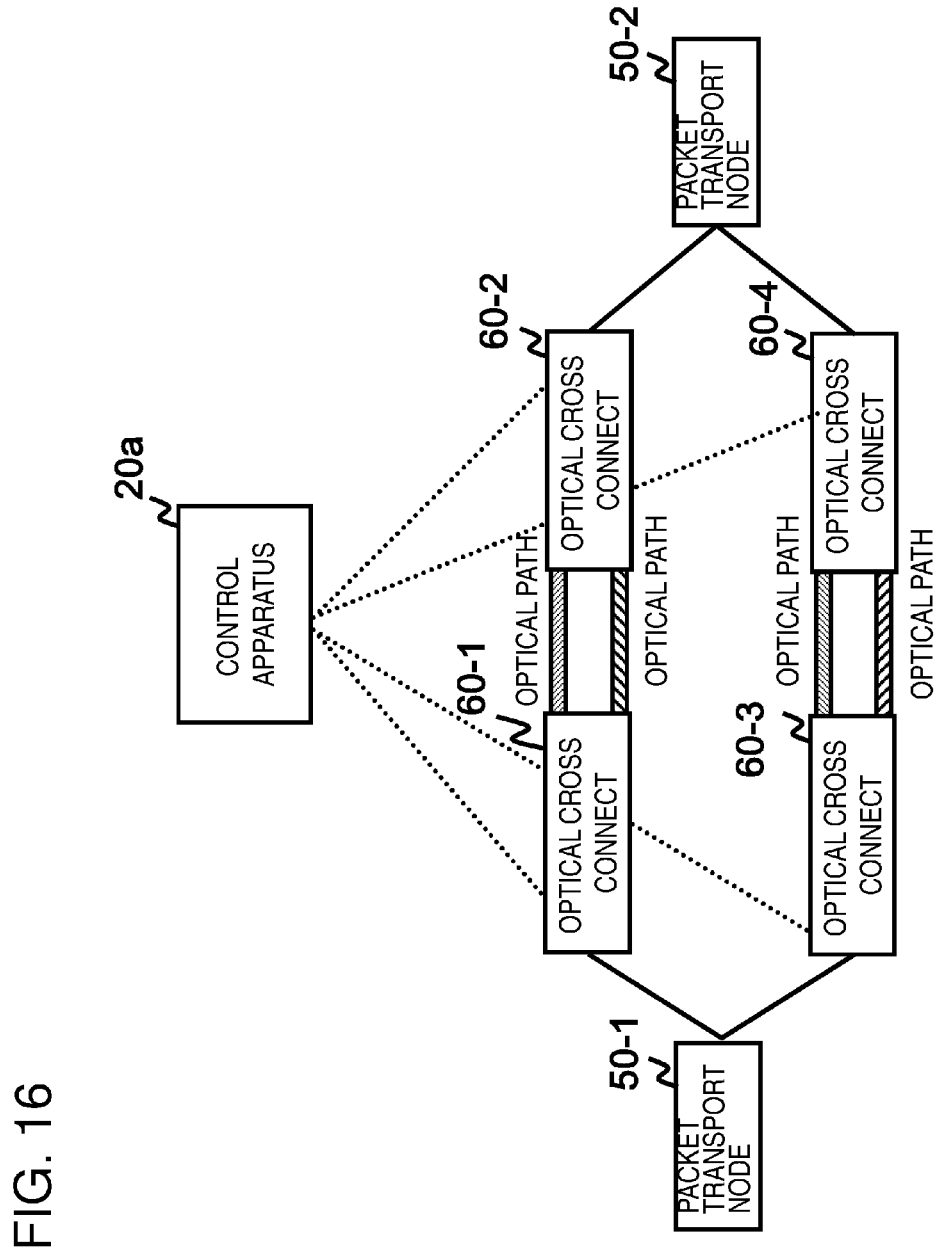
FIG. 16 is a diagram showing an example of a configuration of connections between the packet transport nodes 50-1 and 50-2 shown in FIG. 3.

FIG. 16 is a diagram showing an example of a configuration connecting the packet transport nodes 50-1 and 50-2 shown in FIG. 3. Referring to FIG. 16, a configuration is shown that includes optical cross-connects 60-1 to 60-4 (OXC60-1 to OXC60-4) that implement communication between packet transport nodes 50-1 and 50-2. The packet transport node 50-1 and the optical cross-connects 60-1 and 60-3 are connected via an Ethernet cable or the like. Similarly, the packet transport node 50-2 is connected to the optical cross-connects 60-2 and 60-4.

The optical cross-connects 60-1 and 60-2 are connected using an optical fiber cable. The optical cross-connects 60-3 and 60-4 are similarly connected. Between the optical cross-connects, an optical transmission path (optical path) is formed to connect the packet transport nodes 50-1 and 50-2, and data is transmitted. In communication between the optical cross-connects, a Wavelength Division Multiplex (WDM) transmission system is used, and transmission of optical signals using multiple wavelengths is performed. Between the optical cross-connects, a plurality of optical paths can be formed by specifying a wavelength to be used when transmitting optical data. In the example shown in FIG. 16, 2 optical paths are formed between the optical cross-connects 60-1 and 60-2 (2 different wavelengths are used). Similarly, 2 optical paths are formed between the optical cross-connects 60-3 and 60-4. It is to be noted that, in order to facilitate understanding, FIG. 16 does not show connections between the optical cross-connect 60-1 and the optical cross-connect 60-4, and between the optical cross-connect 60-3 and the optical cross-connect 60-2. However, it is also possible to form an optical path between these optical cross-connects. Furthermore, the number of optical paths formed between the respective optical cross-connects is 2, but this is exemplary, and there is no limitation to the number of optical paths.

When the packet transport node 50-1 forwards a packet towards the packet transport node 50-2, a selection is made either to forward the packet to the optical cross-connect 60-1, or to forward the packet to the optical cross-connect 60-3. The packet transport node 50-2 receives the packet from the optical cross-connects 60-2 or 60-4, and processes the packets in accordance with a packet handling operation. In this way, the packet transport nodes 50-1 and 50-2 are connected using a plurality of optical paths formed between a plurality of optical cross-connects.

A control apparatus 20a sets packet handling operations specifying processing when packets are received by respective optical cross-connects, with respect to the optical cross-connects 60-1 to 60-4. More specifically, the control apparatus 20a sets optical paths accommodating TCP/IP flows, in accordance with TCP/IP flows received by the respective optical cross-connects. For example, in the optical cross-connect 60-1 a packet handling operation is set, such as a certain TCP/IP flow being accommodated in an optical path 1, and another TCP/IP flow being accommodated in an optical path 2.

Determination of optical paths accommodating TCP/IP flows (assigning TCP/IP flows) is implemented by specifying wavelength to be used in forwarding received packets. By specifying the wavelength, it is possible to specify a specific optical path from among a plurality of optical paths that can be formed between respective optical cross-connects.

The optical cross-connects 60-1 to 60-4 perform packet processing in accordance with a packet handling operation set by the control apparatus 20a. It is to be noted that in a case where no packet handling operation exists that matches a match field of a received packet, the optical cross-connects 60-1 to 60-4 make an enquiry to the control apparatus 20a regarding processing for the received packet. The control apparatus 20a that receives the enquiry calculates a packet handling operation for the received packet and makes a setting in the optical cross-connects 60-1 to 60-4.

As described above, in the communication system according to the present exemplary embodiment, OpenFlow switches, packet transport nodes and optical cross-connects are targets for control by the control apparatus 20a. Configurations and operations of the OpenFlow switches and the packet transport nodes included in the communication system according to the present exemplary embodiment have no points of difference from the description of the first exemplary embodiment, and therefore further descriptions are omitted.

Figure 17:
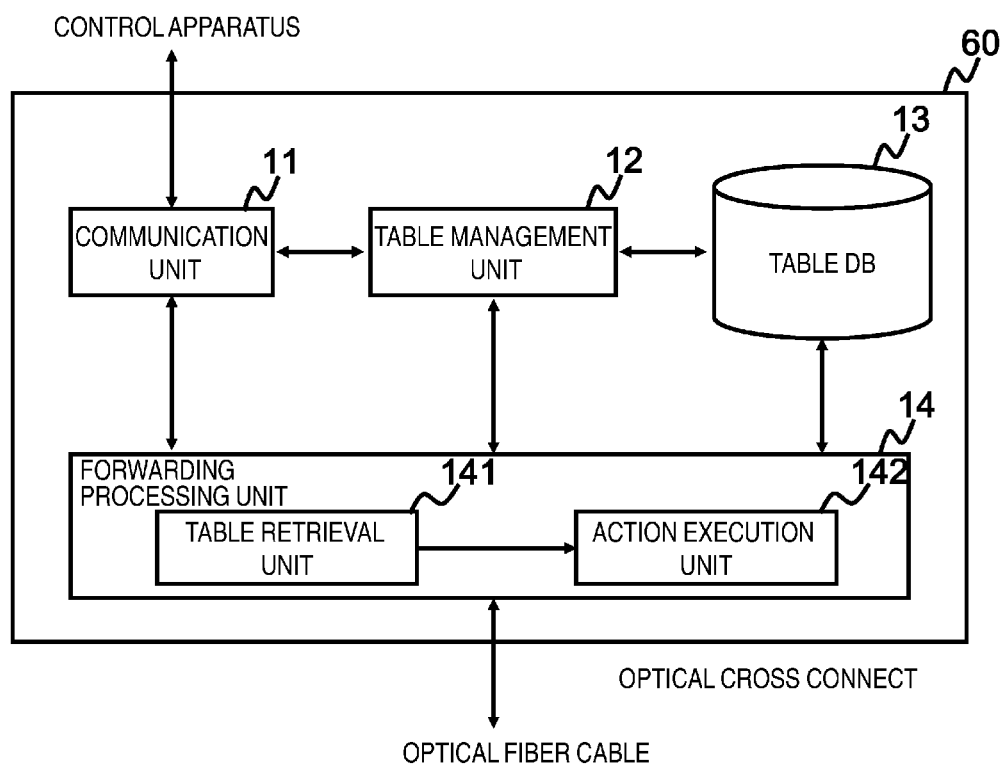
FIG. 17 is a diagram showing an example of an internal configuration of an optical cross-connect 60.

FIG. 17 is a diagram showing an example of an internal configuration of an optical cross-connect 60 (described as "optical cross-connect 60" below when there is no particular need to distinguish between the optical cross-connects 60-1 to 60-4). The main internal configuration of the optical cross-connect 60 conforms with the main internal configuration of the OpenFlow switch 10 shown in FIG. 4. Accordingly, a detailed description concerning the internal configuration of the optical cross-connect 60 is omitted.

A point of difference between the OpenFlow switch 10 and the optical cross-connect 60 is that packet handling operations recorded in a table DB 13 are different. With the packet handling operations recorded in the table DB 13 being different, contents of packet processing executed in accordance with the relevant packet handling operations by an action execution unit 142 are also different.

FIG. 18 is an example of a table set in the table DB 13 of the optical cross-connect 60-1. In the example of FIG. 18, a packet handling operation is set that implements forwarding of packets using an optical path 1 or an optical path 2 for TCP/IP flows received by the optical cross-connect 60-1. In a case of receiving a TCP/IP flow where A1 is set as a transmission source IP address and A2 is set as a destination IP address, the first processing from the top in FIG. 18 is executed. When the optical cross-connect 60-1 receives this type of received packet (transmission source IP address=A1, destination IP address=A2), a table retrieval unit 141 of the optical cross-connect 60-1 retrieves the first packet handling operation from the top of the table in FIG. 18, as a packet handling operation matching the received packet. An action execution unit 142 of the optical cross-connect 60-1 then performs packet processing in accordance with content shown in an instruction field thereof (uses the optical path 1). More specifically, the action execution unit 142 of the optical cross-connect 60-1 uses a wavelength corresponding to the optical path 1 and forwards the received packet. The optical cross-connect 60-1 forwards the packet towards the optical cross-connect 60-2. Similarly, on receiving a packet with transmission source IP address D1 and destination IP address=D2, the optical cross-connect 60-1 forwards the packet using the optical path 2. It is to be noted that, in a case where no packet handling operation corresponding to the received packet exists, the optical cross-connect 60 requests setting of a packet handling operation, with respect to the control apparatus 20a. The "Time To Live" is set as an expiry condition, similar to the OpenFlow switch 10. It is to be noted that an example is shown here using the transmission source IP address and the destination IP address of a packet as decision conditions, but it is also possible to use an arbitrary decision condition. For example, it is also possible to have an input port number as a decision condition.

In this way, the optical cross-connect 60 selects a pseudo line when forwarding a received packet, in accordance with a packet handling operation set by the control apparatus 20a. In order words, the control apparatus 20a determines an optical path accommodating the relevant TCP/IP flow, for each TCP/IP flow received by the optical cross-connect 60.

Next, a description is given concerning the control apparatus 20a.

The following 2 points are different with respect to the control apparatus 20 and the control apparatus 20a. First, the control apparatus 20a can control (can communicate with) an optical cross-connect. Second, the method of calculating a network path for an unknown flow is different. Since there is no point of difference regarding internal configuration of the control apparatus 20 and the control apparatus 20a, a description corresponding to FIG. 8 concerning the control apparatus 20a is omitted. It is to be noted that since the control apparatus 20a also has the optical cross-connect 60 as a control target, a network configuration management unit 21 obtains properties of the optical cross-connect 60 via a node communication unit 28. The network configuration management unit 21 manages network configuration of the communication system by consolidating properties of the optical cross-connect 60, in addition to OpenFlow switches or the like.

The optical cross-connect 60 that receives a request to transmit properties from the control apparatus 20a, responds with its own property or properties to the control apparatus 20a. FIG. 19 is a diagram showing an example in which properties related to the optical cross-connects 60-1 and 60-3 are summarized. From FIG. 19 it may be understood that a port of the optical cross-connect 60-1 is connected to the optical cross-connect 60-2. Similarly, a port of the optical cross-connect 60-3 is connected to the optical cross-connect 60-4. Optical paths that can be formed between the optical cross-connect 60-1 and the optical cross-connect 60-2 are the 3 optical paths 1-1 to 1-3. Furthermore, optical paths that can be formed between the optical cross-connect 60-3 and the optical cross-connect 60-4 are the 2 optical paths 2-1 and 2-2. It is to be noted that the number of optical paths that can be formed between the optical cross-connects shown in FIG. 19 is exemplary, and there is no limitation to the number of optical paths shown in FIG. 19. The network configuration management unit 21 summarizes such information to be recorded in the network configuration DB 22.

Since the control apparatus 20a also has the optical cross-connect 60 as a control target, information regarding network paths stored in the network path DB 25 is added. FIG. 20 is a diagram showing an example of network paths stored in the network path DB 25. Referring to FIG. 20, TCP/IP flows with flow IDs of ID21 to ID30 are forwarded by logical paths from OpenFlow switch 10-1 to OpenFlow switch 10-2. Meanwhile, TCP/IP flows with flow IDs of ID31 and ID32 are forwarded by logical paths from OpenFlow switch 10-1 to OpenFlow switch 10-3. TCP/IP flows with ID21 to ID23 are accommodated in pseudo line 1-1. TCP/IP flows with ID24 and ID25 are accommodated in pseudo line 1-2. TCP/IP flows with ID26 and ID27 are accommodated in pseudo line 1-3. TCP/IP flows with ID28 and ID29 are accommodated in pseudo line 2-1. A TCP/IP flow with ID30 is accommodated in pseudo line 2-2. Furthermore, a TCP/IP flow with ID21 is accommodated in optical path 1-1. TCP/IP flows with ID22 and ID30 are accommodated in optical path 1-2. TCP/IP flows with ID23 and ID29 are accommodated in optical path 1-3. TCP/IP flows with ID24 and ID28 are accommodated in optical path 2-1. TCP/IP flows with ID25 to ID27 are accommodated in optical path 2-2.

The path/action calculation unit 24 calculates a logical path, pseudo line and optical path, to accommodate an unknown TCP/IP flow, based on the network configuration recorded in the network configuration DB 22 and the network paths recorded in the network path DB 25.

Next, a description is given concerning operations of the present exemplary embodiment, making reference to the drawings.

As described above, the control apparatus 20a according to the present exemplary embodiment differs from the control apparatus 20 with regard to a method of calculating a network path for an unknown flow. More specifically, the calculation of the network path for each TCP/IP flow in the path/action calculation unit 24 is different. Therefore, a description is given concerning the calculation of the network path and setting of a packet handling operation in the control apparatus 20a.

Figure 21:
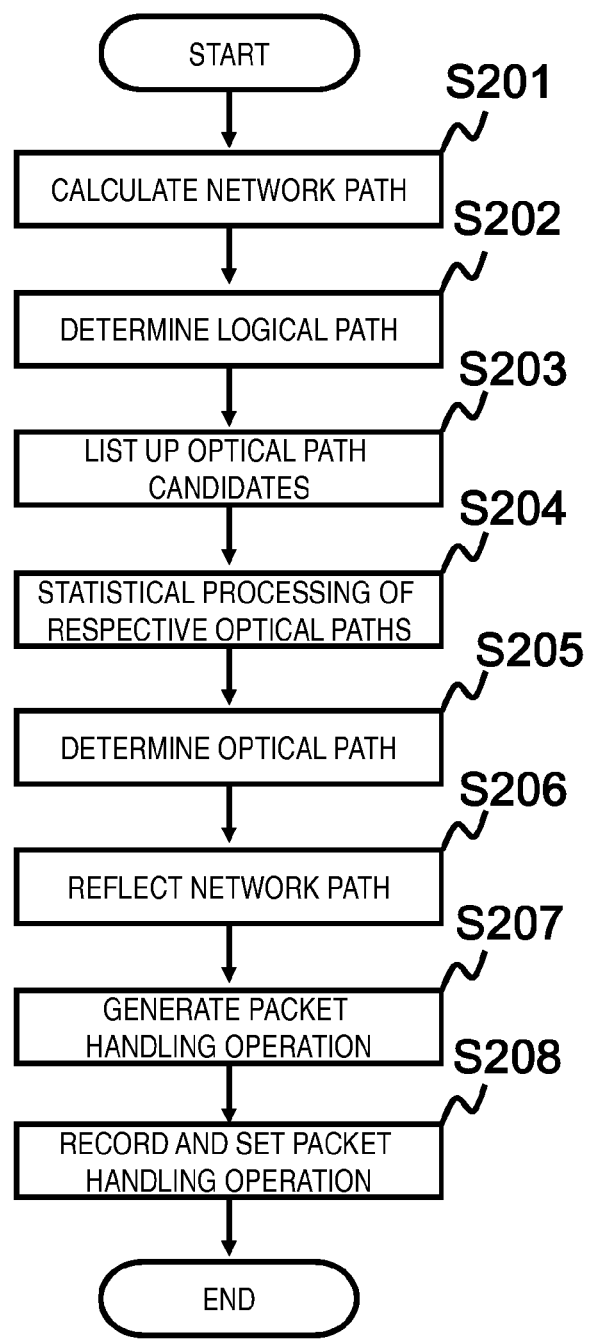

FIG. 21 is a flowchart showing an example of operations of the control apparatus 20a. FIG. 21 differs from the operational example shown in FIG. 13 with regard to operations of steps S203 to S207. Accordingly, a description concerning other steps is omitted. It is to be noted that the flow ID of the unknown TCP/IP flow is ID33.

In step S203, the path/action calculation unit 24 lists up optical path candidates that can implement a logical path from the OpenFlow switch 10-1 to the OpenFlow switch 10-2. At this time, the path/action calculation unit 24 obtains properties concerning the OpenFlow switch 10-1, properties concerning the packet transport nodes 50-1 and 50-3, and properties concerning the optical cross-connects 60-1 and 60-3, from the network configuration DB 22. Referring to FIG. 9, FIG. 10 and FIG. 19, there are 5 optical path candidates: the optical paths 1-1 to 1-3 formed between the optical cross-connects 60-1 and 60-2, and the optical paths 2-1 to 2-2 formed between the optical cross-connects 60-3 and 60-4.

In step S204, the path/action calculation unit 24 performs statistical processing for each listed optical path. More specifically, the total number of TCP/IP flows accommodated in the respective optical paths is counted. At this time, the path/action calculation unit 24 uses the network paths stored in the network path DB 25. For example, candidate optical paths are extracted from among the optical paths shown in FIG. 20 and the number of candidate optical paths is calculated. FIG. 22 is a diagram summarizing the total number of TCP/IP flows accommodated in candidate optical paths.

In step S205, the path/action calculation unit 24 determines an optical path with the minimum number of TCP/IP flows that are accommodated in a candidate optical path. In the example of FIG. 22, this corresponds to the optical path 1-1. At a point in time when the present step ends, a logical path, a pseudo line and an optical path, accommodating the TCP/IP flow with ID13, are confirmed. Finally, an optical path that is to accommodate a TCP/IP flow with ID33 is confirmed as the optical path 1-1. This is because, when the optical path is confirmed, the pseudo line to be used is confirmed, and a forwarding destination of a received packet is confirmed in the OpenFlow switch 10-1.

In step S206, the path/action calculation unit 24 reflects the confirmed TCP/IP flow with ID33, in a network path stored in the network path DB 25 (update of the network path DB 25). More specifically, a destination where the TCP/IP flow with ID33 is accommodated is confirmed as below.

Logical path; accommodated in a logical path from OpenFlow switch 10-1 to 10-2.
Pseudo line; accommodated in pseudo line 1-1.
Optical path; accommodated in the optical path 1-1.

The path/action calculation unit 24 records the confirmed network path in the network path DB 25. FIG. 23 is a diagram reflecting a network path corresponding to the TCP/IP flow with ID33, with respect to FIG. 20. In addition, the confirmed network path is delivered by the path/action calculation unit 24 to the packet handling operation management unit 26.

In step S207, the packet handling operation management unit 26 generates packet handling operations to be set in the OpenFlow switch 10-1, the packet transport node 50-1 and the optical cross-connect 60-1, from the delivered network path. In the abovementioned example, since the pseudo line 1-1 is used as a network path, a packet handling operation is generated that forwards a received packet corresponding to the TCP/IP flow with ID33 to a port directed towards the packet transport node 50-1, with regard to the OpenFlow switch 10-1. The packet handling operation management unit 26 generates a packet handling operation that uses the pseudo line 1-1, with regard to the packet transport node 50-1. Furthermore, the packet handling operation management unit 26 generates a packet handling operation that uses the optical path 1-1, with regard to the optical cross-connect 60-1. The description above concerns calculation of a network path and setting of a packet handling operation in the control apparatus 20a.

In the communication system according to the first exemplary embodiment, since consideration is given to information concerning the optical cross-connect 60, the TCP/IP flow with ID33 is accommodated in pseudo line 2-2. However, 2 TCP/IP flows (ID22 and ID30) are already accommodated in the optical path 1-2 used by the pseudo line 2-2. Meanwhile, the optical path 1-1 accommodates only 1 TCP/IP flow (ID21). Therefore, having an unknown TCP/IP flow accommodated in the optical path 1-1 rather than in the optical path 1-2 contributes more to distribution of load and performance improvement of the communication system.

It is to be noted that a description has been given concerning a communication system according to the present exemplary embodiment, using an optical cross-connect as an example of a device forms an optical path used by a pseudo line. However, apparatuses used are not limited to optical cross-connects. It is also possible to have a communication system in which optical paths are formed by devices such as an optical router or the like.

In this way, in the communication system according to the present exemplary embodiment, when a packet handling operation to be set in the OpenFlow switch 10 and packet transport node 50 is generated, use is made of the number of optical paths, which is information concerning a layer (physical layer; first layer) to which the optical cross-connect 60 belongs. As a result, an uneven distribution of optical paths accommodating TCP/IP flows does not occur, and it is possible to efficiently operate the overall communication system to an even greater extent.

Third Exemplary Embodiment

Next, a detailed description is given concerning a third exemplary embodiment, making reference to the drawings.

In the second exemplary embodiment, a description was given concerning a communication system provided with 1 pair of optical cross-connects between packet transport nodes. In the present exemplary embodiment, a description is given concerning a communication system provided with a plurality of optical cross-connects between packet transport nodes. The configurations between OpenFlow switches and packet transport nodes of the communication system according to the present exemplary embodiment are the same as the configurations shown in FIG. 2 and FIG. 3. Therefore, descriptions corresponding to FIG. 2 and FIG. 3 in the communication system according to the present exemplary embodiment are omitted.

Figure 24:
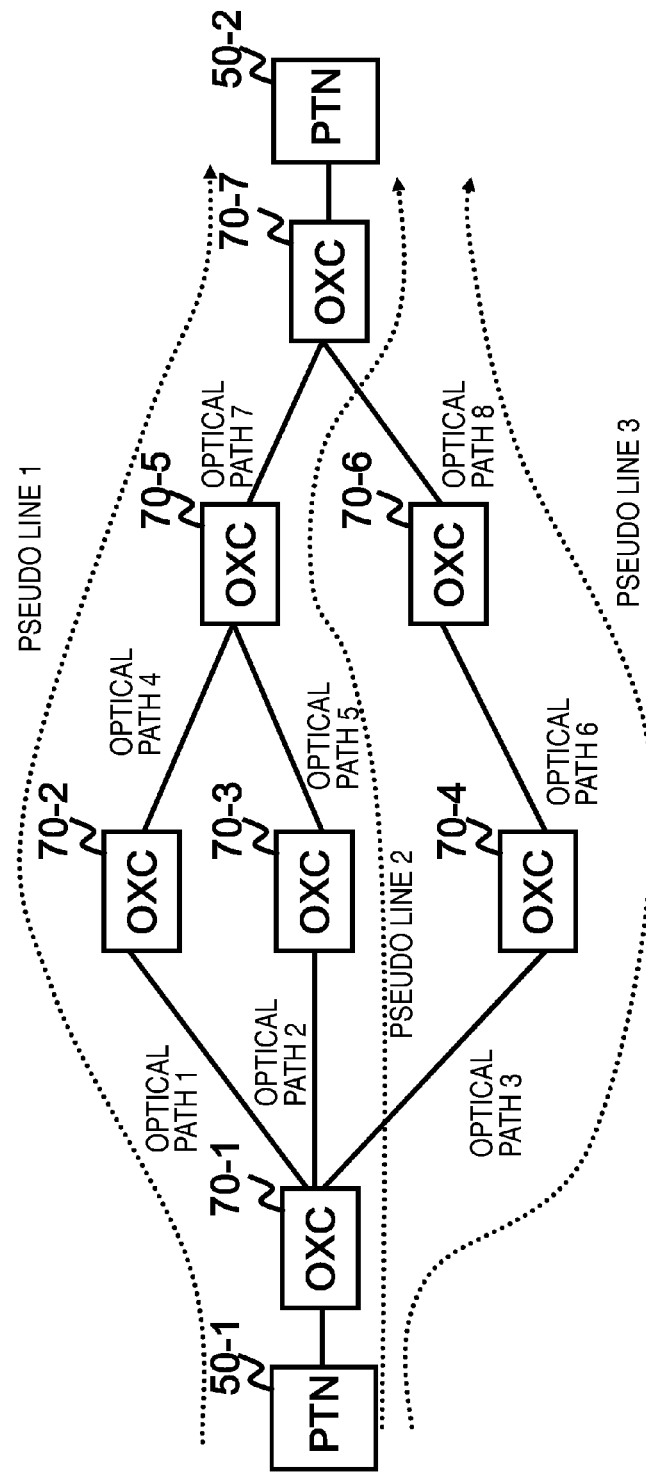
FIG. 24 is a diagram showing an example of a configuration of connections between the packet transport nodes 50-1 and 50-2 shown in FIG. 3.

FIG. 24 is a diagram showing an example of a configuration connecting the packet transport nodes 50-1 and 50-2 shown in FIG. 3. It is to be noted that a control apparatus 20b according to the present exemplary embodiment is not illustrated in FIG. 24, but optical cross-connects 70-1 to 70-7 perform packet processing in accordance with a packet handling operation set by the control apparatus 20b.

It is possible to form 3 pseudo lines between the packet transport nodes 50-1 and 50-2. The pseudo lines between the packet transport nodes 50-1 and 50-2 are pseudo lines 1 to 3. The respective pseudo lines pass through a plurality of optical cross-connects. Optical paths 1 to 8 are formed among the optical cross-connects 70-1 to 70-7 of FIG. 24. FIG. 25 is a diagram showing relationships of the 3 pseudo lines and optical paths included in the respective pseudo lines. According to FIG. 25, for example, optical paths 1, 4 and 7 are included in the pseudo line 1.

A packet forwarded by the pseudo line 1 is delivered to the packet transport node 50-2, via the optical cross-connects 70-1, 70-2, 70-5 and 70-7. It is to be noted that FIG. 24 is an example of the communication system, and the communication system configuration is not limited to that of FIG. 24.

When the packet transport node 50-1 forwards a packet towards the packet transport node 50-2, a selection is made of any of the pseudo lines 1 to 3.

The control apparatus 20b sets packet handling operations specifying processing when packets are received by respective optical cross-connects, with respect to the optical cross-connects 70-1 to 70-7. More specifically, the control apparatus 20b sets optical paths accommodating TCP/IP flows, in accordance with TCP/IP flows received by the respective optical cross-connects. For example, in the optical cross-connect 70-1 a packet handling operation is set, such as a certain TCP/IP flow being accommodated in the optical path 1, another TCP/IP flow being accommodated in the optical path 2, and a further TCP/IP flow being accommodated in an optical path 3.

The optical cross-connects 70-1 to 70-7 perform packet processing in accordance with a packet handling operation set by the control apparatus 20b. It is to be noted that in a case where no packet handling operation exists that matches a match field of a received packet, the optical cross-connects 70-1 to 70-7 make an enquiry to the control apparatus 20b with respect to the received packet. The control apparatus 20b that receives the enquiry generates a packet handling operation for the received packet and makes a setting in the optical cross-connects 70-1 to 70-7.

As described above, in the communication system according to the present exemplary embodiment, OpenFlow switches, packet transport nodes and optical cross-connects are targets for control by the control apparatus 20b. Configurations and operations of the OpenFlow switches and the packet transport nodes included in the communication system according to the present exemplary embodiment have no points of difference from the description of the first exemplary embodiment, and therefore further descriptions are omitted. There is no point of difference between the internal configuration of an optical cross-connect 70 (described as "optical cross-connect 70" below when there is no particular need to distinguish between the optical cross-connects 70-1 to 70-7), and the optical cross-connect 60.

However, when selecting an optical path, the optical cross-connect 70 performs the optical path selection by switching connection ports, rather than switching wavelength when transmitting optical data. For example, in the optical cross-connect 70-1, when using the optical path 1, packets are transmitted to a port directed toward the optical cross-connect 70-2. Therefore, an action execution unit 142 of the optical cross-connect 70 switches connection port by which packets are forwarded, in accordance with a packet handling operation. It is to be noted that, in a case where no packet handling operation corresponding to a received packet exists, the optical cross-connect 70 requests setting of a packet handling operation, with respect to the control apparatus 20b.

The optical cross-connect 70 selects an optical path when forwarding a received packet, in accordance with a packet handling operation set by the control apparatus 20b. In order words, the control apparatus 20b determines an optical path to accommodate the relevant TCP/IP flow, for each TCP/IP flow received by the optical cross-connect 70.

Next, a description is given concerning the control apparatus 20b. Methods of calculation network path for an unknown flow are different for the control apparatus 20a and the control apparatus 20b. That is, since there is no point of difference regarding internal configuration of the control apparatus 20 and the control apparatus 20b, a further description concerning the control apparatus 20b is omitted. Since the control apparatus 20b also has the optical cross-connect 70 as a control target, a network path including the optical cross-connect 70 is stored in the network path DB 25.

FIG. 26 is a diagram showing an example of network paths stored in the network path DB 25. It is to be noted that, while a description is omitted in FIG. 26, TCP/IP flows with flow IDs of ID41 to ID43 are forwarded by logical paths from OpenFlow switch 10-1 to OpenFlow switch 10-2. TCP/IP flows with ID41 to ID42 are respectively accommodated in pseudo lines 1 to 3. Furthermore, a TCP/IP flow with ID41 is accommodated in optical path 1, optical path 4 and optical path 7. A TCP/IP flow with ID42 is accommodated in optical path 2, optical path 5 and optical path 7. A TCP/IP flow with ID43 is accommodated in optical path 3, optical path 6 and optical path 8.

The path/action calculation unit 24 of the control apparatus 20b calculates a logical path, pseudo line and optical path accommodating an unknown TCP/IP flow, based on the network configuration recorded in the network configuration DB 22 and the network paths recorded in the network path DB 25.

Next, a description is given concerning operations of the present exemplary embodiment, making reference to the drawings. As described above, the control apparatus 20b according to the present exemplary embodiment differs from the control apparatus 20a with regard to method of calculating a network path for an unknown flow. More specifically, calculation of a network path for each TCP/IP flow in the path/action calculation unit 24 is different. Therefore, a description is given concerning calculation of the network path and setting of a packet handling operation in the control apparatus 20b.

Figure 27:
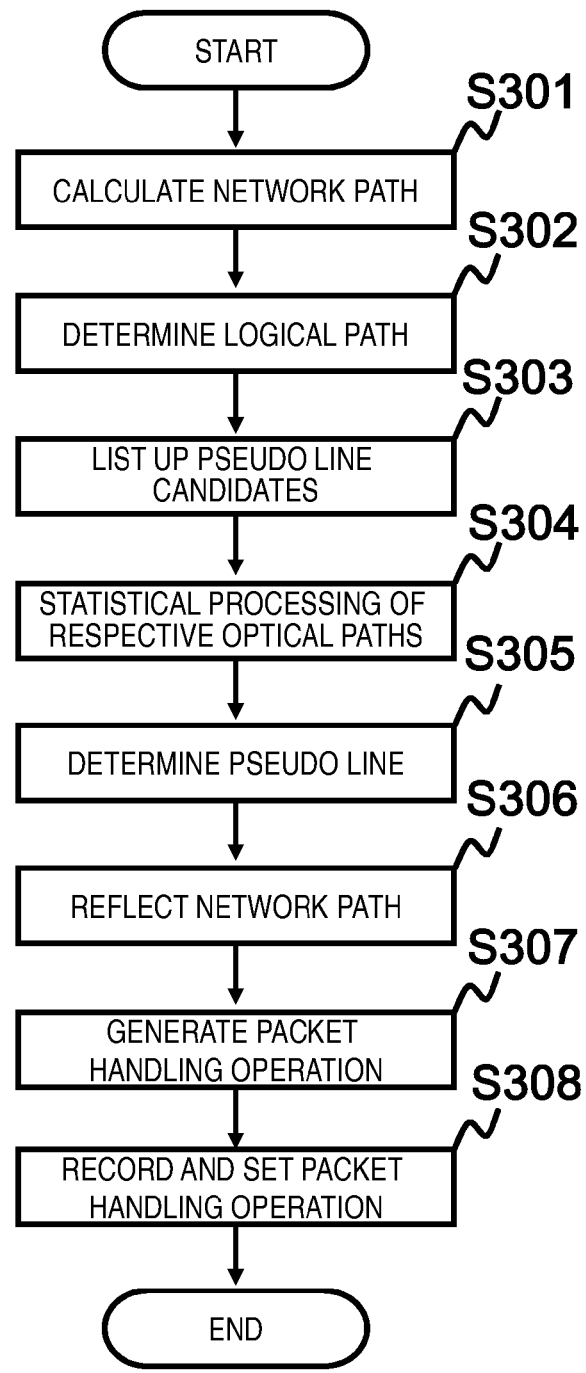
FIG. 27 is a flowchart showing an example of operations of a control apparatus 20b.

FIG. 27 is a flowchart showing an example of operations of the control apparatus 20b. FIG. 27 differs from the operational example shown in FIG. 21 with regard to operations of steps S303 to S307. Accordingly, a description concerning other steps is omitted. It is to be noted that the ID of the unknown TCP/IP flow is ID44.

In step S303, the path/action calculation unit 24 lists up pseudo line candidates that can implement a logical path from the OpenFlow switch 10-1 to the OpenFlow switch 10-2. At this time, the path/action calculation unit 24 obtains properties concerning the OpenFlow switch 10-1, properties concerning the packet transport nodes 50-1 and 50-3, and properties concerning the optical cross-connects 70-1 to 70-7, from the network configuration DB 22. Here, pseudo lines 1 to 3 are listed up as pseudo line candidates that can implement a logical path from the OpenFlow switch 10-1 to the OpenFlow switch 10-2.

In step S304, the path/action calculation unit 24 performs statistical processing based on optical paths included in the listed pseudo lines. At this time, the path/action calculation unit 24 uses the network paths stored in the network path DB 25. More specifically, the path/action calculation unit 24 calculates the maximum value of TCP/IP flows accommodated in the optical paths used by the respective pseudo lines.

In the example of FIG. 26, optical path 1, optical path 4 and optical path 7 are included in pseudo line 1. If the number of TCP/IP flows included in each optical path is counted, optical path 1 includes 1 TCP/IP flow, optical path 4 includes 1 TCP/IP flow, and optical path 7 includes 2 TCP/IP flows. Therefore, the maximum value of TCP/IP flows accommodated in an optical path used by pseudo line 1 is 2. A calculation is similarly made for pseudo lines 2 and 3. As a result, the maximum value of TCP/IP flows accommodated in an optical path used by pseudo line 2 is 2. The maximum value of TCP/IP flows accommodated in an optical path used by pseudo line 3 is 1.

The path/action calculation unit 24 calculates the value of: the total number of TCP/IP flows accommodated in the optical paths used by the respective pseudo lines, divided by the number of optical fiber cables used by each of the pseudo lines. Such a value can be regarded as an average value of TCP/IP flows accommodated in 1 optical fiber cable used by the respective pseudo lines.

In the example of FIG. 26, if the average value of accommodated TCP/IP flows with regard to each pseudo line is calculated, for pseudo line 1 the value is 1.3 (4/3), for pseudo line 2 the value is 1.3, and for pseudo line 3 the value is 1. FIG. 28 is a diagram summarizing maximum values and average values calculated for each pseudo line.

In step S305, the path/action calculation unit 24 determines a pseudo line for which the calculated maximum value is smallest. In the example of FIG. 28, since the maximum value of pseudo line 3 is 1, pseudo line 3 is selected. At a point in time when the present step ends, a pseudo line accommodating the TCP/IP flow with ID44 is confirmed. Finally, an optical path that is to accommodate a TCP/IP flow with ID44 is confirmed as optical path 3. When the pseudo line is confirmed, the optical path to be used is confirmed. This is in order to confirm a forwarding destination of an OpenFlow switch accompanying confirmation of the pseudo line.

In step S306, the path/action calculation unit 24 reflects the confirmed TCP/IP flow with ID44, in a network path stored in the network path DB 25 (updates the network path DB 25). More specifically, a destination where the TCP/IP flow with ID44 is accommodated is confirmed as below.

Logical path; accommodated in a logical path from OpenFlow switch 10-1 to 10-2.

Pseudo line; accommodated in pseudo line 3.

Optical line; accommodated in optical path 3, optical path 6, and optical path 8.

The path/action calculation unit 24 records the confirmed network path in the network path DB 25.

FIG. 29 is a diagram reflecting a network path corresponding to the TCP/IP flow with ID44, with respect to FIG. 26. In addition, the confirmed network path is delivered by the path/action calculation unit 24 to the packet handling operation management unit 26.

In step S307, the packet handling operation management unit 26 generates packet handling operations to be set in the OpenFlow switch 10-1, the packet transport node 50-1, and the optical cross-connect 70-1, from the delivered network path. Since the pseudo line 3 is used as a network path, a packet handling operation is generated that forwards a received packet corresponding to the TCP/IP flow with ID44 to a port directed towards the packet transport node 50-1, with regard to the OpenFlow switch 10-1.

The packet handling operation management unit 26 generates a packet handling operation using the pseudo line 3, with regard to the packet transport node 50-1. Furthermore, the packet handling operation management unit 26 generates a packet handling operation to forward the TCP/IP flow with ID44 to a port directed towards the optical cross-connect 70-4, with regard to the optical cross-connect 70-1. The description above concerns calculation of a network path and setting of a packet handling operation in the control apparatus 20b.

It is to be noted that in step S305 in FIG. 27, the path/action calculation unit 24 determines a pseudo line for which the calculated maximum value is smallest. However, according to the state of the network path, the maximum values of TCP/IP flows accommodated by respective optical paths may coincide. In such a case, the path/action calculation unit 24 determines pseudo lines, giving consideration to the number of TCP/IP flows (average value as described above) accommodated in each optical fiber cable.

For example, the network path has a state as in FIG. 29. In this case, an analysis should be made as to whether an unknown TCP/IP flow (with assumed ID45) should be accommodated in any of the pseudo lines. With regard to a network path of FIG. 29, calculation of the maximum value and average value of optical paths, as accommodated in optical paths included in each pseudo lines, is as in FIG. 30.

Since maximum values for respective pseudo lines coincide and the value thereof is 2, as shown in FIG. 30, the path/action calculation unit 24 cannot decide, from the maximum value, whether the TCP/IP flow with ID45 should be accommodated in any of the pseudo lines. Therefore, the path/action calculation unit 24 uses the calculated average value to determine a pseudo line to accommodate the TCP/IP flow with ID45. More specifically, a selection is made of a pseudo line for which the calculated average value is smallest. In the example of FIG. 30, since the average value of pseudo line 1 or 2 is smaller than pseudo line 3, pseudo line 1 or 2 is selected.

In this way, the path/action calculation unit 24 decides the pseudo line to accommodate an unknown TCP/IP flow, based not only on the maximum value of TCP/IP flows accommodated by optical paths included in the respective pseudo line, but also the average value of TCP/IP flows accommodated in 1 optical fiber cable.

For example, in the network paths shown in FIG. 26, if it is decided to accommodate an unknown TCP/IP flow in pseudo line 1 or 2, then 3 TCP/IP flows are accommodated in optical path 7. This state may be said to be an imbalanced state when viewed from the overall communication system. That is, avoiding usage of optical path 7 in which 2 TCP/IP flows are already accommodated, as much as possible, and using another optical path contributes to distribution of load balancing and performance improvement in the overall communication system.

As described above, in the communication system according to the present exemplary embodiment, in a case where a plurality of optical cross-connects are included between packet transport nodes, statistical processing is performed with respect to the number of TCP/IP flows accommodated in the optical paths included in the respective pseudo lines. As a result, an uneven distribution in optical paths accommodating TCP/IP flows does not occur, and it is possible to efficiently operate the overall communication system.

Fourth Exemplary Embodiment

Next, a detailed description is given concerning a fourth exemplary embodiment, making reference to the drawings.

In the control apparatus 20b according to the third exemplary embodiment, statistical processing is performed with regard to the number of TCP/IP flows accommodated by optical paths included in the respective pseudo lines, and a destination to accommodate the TCP/IP flows is decided. In a control apparatus 20c according to the present exemplary embodiment, pseudo lines accommodating TCP/IP flows are decided based on bandwidth (throughput; that is, data quantity forwarded by an optical fiber cable per unit time) of optical fiber cables used by respective optical paths. Since there is no point of difference between the configurations of the communication system according to the present exemplary embodiment and the communication system according to the third exemplary embodiment, further descriptions are omitted. Furthermore, since there is no point of difference concerning internal configurations of the control apparatus 20c, OpenFlow switch 10, packet transport node 50 and optical cross-connect 70, further descriptions are omitted.

There is a point of difference between the control apparatus 20c and the control apparatus 20b in a method of calculation a network path for an unknown flow by a path/action calculation unit 24. Therefore, a description is given of the method of calculating a network path for an unknown flow in the control apparatus 20c.

The path/action calculation unit 24 of the control apparatus 20c estimates bandwidth of optical fiber cable used by respective optical paths, and sets a pseudo line including the optical fiber cable with the minimum estimated bandwidth to a pseudo line accommodating an unknown TCP/IP flow. It is to be noted that the path/action calculation unit 24 uses the following formula (1) to estimate bandwidth for each optical fiber cable.

$$\text{Bandwidth} = \frac{X}{\omega} \times \text{Min}\left(\frac{W}{R}, \frac{C}{R\sqrt{P}}\right) \quad (1)$$

Note that W indicates receive window, R indicates round trip delay time, P indicates packet loss rate, C indicates a constant, X indicates the number of TCP/IP flows accommodated in respective optical fiber cables, and ω indicates link bandwidth of respective optical fiber cables. For example, for a round drip delay time R, and a packet loss rate P, by using a Delay Measurement function and Loss Measurement function in MPLS-TP OAM (Operation, Administration and Management) between a packet transport node 50-1 and a packet transport node 50-2 as shown in FIG. 24, it is possible to use a value obtained for each respective pseudo line.

For a network configuration shown in FIG. 24, a description is given concerning a result of estimating bandwidth of each optical fiber cable, by associating respective optical paths and optical fiber cables used by the respective optical paths. In associating optical paths and optical fiber cables, for example, an optical fiber cable used by optical path 1 is taken as optical fiber cable 1.

FIG. 31 is a diagram showing an example of respective parameters described above, for optical fiber cables configuring the network shown in FIG. 24. Optical fiber cable naming in FIG. 31 corresponds to optical path naming in FIG. 24. For example, an optical fiber cable implementing optical path 1 is optical fiber cable 1. It is to be noted that in FIG. 31 and FIG. 32, optical fiber cables are simply written as "cable".

Referring to FIG. 24, since 2 pseudo lines are accommodated in the optical path 7, the number X of TCP/IP flows related to the optical fiber cable 7 corresponding to the optical path 7, is 2. The number X of TCP/IP flows related to other optical fiber cables is 1. The receive window W, round trip delay time R and packet loss rate P related to TCP/IP flows accommodated by the respective optical fiber cables are equivalent. Respective numerical values thereof are as shown in FIG. 31. Note that the link bandwidth of optical fiber cables 3, 6 and 8 is smaller than that of other optical fiber cables (1/10 of the link bandwidth of other optical fiber cables). It is to be noted that the values of respective parameters shown in FIG. 31 are exemplary, and there is no limitation to these values.

The path/action calculation unit 24 of the control apparatus 20*c* calculates estimated values for bandwidth for each optical fiber cable used by respective optical paths, using information related to the respective optical fiber cables, as shown in FIG. 31.

FIG. 32 is a diagram summarizing bandwidth estimated values for each optical fiber cable used by the respective pseudo lines. After calculating the bandwidth estimated values, the path/action calculation unit 24 calculates the total of bandwidth estimated values of the optical fiber cables used by the respective pseudo lines, for each pseudo line. Thereupon, as shown in FIG. 32, the total of the bandwidth estimated values for pseudo line 1 is 0.4; the total of the bandwidth estimated values for pseudo line 2 is 0.4; and the total of the bandwidth estimated values for pseudo line 3 is 3. The path/action calculation unit 24 determines pseudo line 1 or 2 that has the smallest total of bandwidth estimated values, as a pseudo line to accommodate an unknown TCP/IP flow.

In the communication system according to the present exemplary embodiment, bandwidth is estimated for the optical fiber cables used by the respective pseudo lines, and a pseudo line with the smallest total of bandwidth estimated values is determined as a pseudo line to accommodate the unknown TCP/IP flow. As a result, an uneven distribution of optical paths accommodating TCP/IP flows does not occur, and it is possible to efficiently operate the overall communication system.

Some or all of the abovementioned exemplary embodiments may also be described as in the following modes, but there is no limitation thereto.

<First Mode>

As in the communication system according to the first aspect described above.

<Second Mode>

The communication system according to the first mode, comprising a second communication apparatus that forms links in the second layer, and also performs processing related to communication flows based on a second packet handling operation, wherein the control apparatus determines a destination to accommodate communication flows specified according to the first and/or second packet handling operation, based on information related to the second layer.

<Third Mode>

The communication system according to the second mode, wherein the control apparatus determines a destination to accommodate communication flows specified according to the first and/or second packet handling operation, based on information related to a first path that implements links in the second layer.

<Fourth Mode>

The communication system according to the third mode, wherein the control apparatus determines a destination to accommodate communication flows specified according to the first and/or second packet handling operation, by statistical processing of the number of communication flows accommodated in the first path.

<Fifth Mode>

The communication system according to the fourth mode, wherein the control apparatus counts the number of communication flows accommodated in each of a plurality of the first paths, determines the first path with the smallest number of accommodated communication flows as a destination to accommodate communication flows, and also generates the first and/or second packet handling operation in accordance with the determined destination to accommodate the communication flows.

<Sixth Mode>

The communication system according to any one of the second to fifth modes, including a third communication apparatus that forms links in a third layer different from the first and second layers, and also performs processing related to communication flows based on a third packet handling operation, wherein the control apparatus determines a destination to accommodate communication flows specified according to at least one of the first to third packet handling operations, based on information related to the third layer.

<Seventh Mode>

The communication system according to the sixth mode, wherein the control apparatus determines a destination to accommodate communication flows specified according to at least one of the first to third packet handling operations, by statistical processing of the number of communication flows accommodated in each of a plurality of second paths implementing the third layer.

<Eighth Mode>

The communication system according to the seventh mode, wherein the control apparatus counts the number of communication flows accommodated in each of the plurality of second paths, determines the second path with the smallest number of accommodated communication flows as a destination to accommodate communication flows, and also generates at least one of the first to third packet handling operations in accordance with the determined destination to accommodate communication flows.

<Ninth Mode>

The communication system according to the eighth mode, wherein the control apparatus calculates an average value of communication flows accommodated in transmission media, based on the number of communication flows accommodated in each transmission medium used by each of the plurality of second paths and the number of transmission media used by each of the second paths, and determines a destination to accommodate communication flows specified according to at least one of the first to third packet handling operations based on the average value.

<Tenth Mode>

The communication system according to the seventh mode, wherein the control apparatus determines a destination to accommodate communication flows specified according to at least one of the first to third packet handling operations, based on an estimated value of bandwidth for each transmission medium used by the plurality of second paths.

<Eleventh Mode>

As in the control apparatus according to the second aspect described above.

<Twelfth Mode>

The control apparatus according to the eleventh mode, wherein the control apparatus determines a destination to accommodate communication flows specified according to a first packet handling operation set in the first communication apparatus, or a second packet handling operation set in a second communication apparatus that forms links in the second layer, based on information related to the second layer.

<Thirteenth Mode>

The control apparatus according to the twelfth mode, wherein the control apparatus determines a destination to accommodate communication flows specified according to the first and/or second packet handling operation, based on information related to a first path that implements links in the second layer.

<Fourteenth Mode>

The control apparatus according to the thirteenth mode, wherein the control apparatus determines a destination to accommodate communication flows specified according to the first and/or second packet handling operation, by statistical processing of the number of communication flows accommodated in the first path.

<Fifteenth Mode>

The control apparatus according to the fourteenth mode, wherein the control apparatus counts the number of communication flows accommodated in each of a plurality of the first paths, determines the first path with the smallest number of accommodated communication flows as a destination to accommodate communication flows, and also generates the first and/or second packet handling operation in accordance with the determined destination to accommodate communication flows.

<Sixteenth Mode>

The control apparatus according to any one of the twelfth to fifteenth modes, wherein the control apparatus determines a destination to accommodate communication flows specified according to at least one of the first packet handling operation, the second packet handling operation, and a third packet handling operation set in a third communication apparatus that forms links in a third layer that differs from the first and second layers, based on information related to the third layer.

<Seventeenth Mode>

The control apparatus according to the sixteenth mode, wherein the control apparatus determines a destination to accommodate communication flows specified according to at least one of the first to third packet handling operations, by statistical processing of the number of communication flows accommodated in each of a plurality of second paths that implement the third layer.

<Eighteenth Mode>

The control apparatus according to the seventeenth mode, wherein the control apparatus counts the number of communication flows accommodated in each of the plurality of second paths, determines the second path with the smallest number of accommodated communication flows as a destination to accommodate communication flows, and also generates at least one of the first to third packet handling operations in accordance with the determined destination to accommodate communication flows.

<Nineteenth Mode>

The control apparatus according to the eighteenth mode, wherein the control apparatus calculates an average value of communication flows accommodated in a transmission medium, based on the number of communication flows accommodated in each transmission medium used by each of the plurality of second paths and the number of transmission media used by each of the second paths, and determines a destination to accommodate communication flows specified according to at least one of the first to third packet handling operations based on the average value.

<Twentieth Mode>

The control apparatus according to the seventeenth mode, wherein the control apparatus determines a destination to accommodate communication flows specified according to at least one of the first to third packet handling operations, based on an estimated value of bandwidth for each transmission medium used by the plurality of second paths.

<Twenty-First Mode>

As in the control method of the control apparatus according to the third aspect described above.

<Twenty-Second Mode>

The control method of the control apparatus according to the twenty-first mode, including a step of determining a destination to accommodate communication flows specified according to the first packet handling operation or a first packet handling operation set in a second communication apparatus that forms links in the second layer, based on information related to the second layer.

<Twenty-Third Mode>

The control method of the control apparatus according to the twenty-second mode, including a step of determining a destination to accommodate communication flows specified according to the first and/or second packet handling operation, based on information related to a first path that implements links in the second layer.

<Twenty-Fourth Mode>

The control method of the control apparatus according to the twenty-third mode, including a step of determining a destination to accommodate communication flows specified according to the first and/or second packet handling operation, by statistical processing of the number of communication flows accommodated in the first path.

<Twenty-Fifth Mode>

The control method of the control apparatus according to the twenty-fourth mode, including a step of counting the number of communication flows accommodated in each of a plurality of the first paths, determining the first path with the smallest number of accommodated communication flows as a destination to accommodate communication flows, and also generating the first and/or second packet handling operation in accordance with the determined destination to accommodate communication flows.

<Twenty-Sixth Mode>

The control method of the control apparatus according to any one of the twenty-second to the twenty-fifth modes, including a step of determining a destination to accommodate communication flows specified according to at least one of the first packet handling operation, the second packet handling operation, and a third packet handling operation set in a third communication apparatus that forms links in a third layer that differs from the first and second layers, based on information related to the third layer.

<Twenty-Seventh Mode>

The control method of the control apparatus according to the twenty-sixth mode, including a step of determining a destination to accommodate communication flows specified according to at least one of the first to third packet handling operations, by statistical processing of the number of communication flows accommodated in each of a plurality of second paths that implement the third layer.

<Twenty-Eighth Mode>

The control method of the control apparatus according to the twenty-seventh mode, including a step of counting the number of communication flows accommodated in each of the plurality of second paths, determining the second path with the smallest number of accommodated communication flows as a destination to accommodate communication flows, and also generating at least one of the first to third packet handling operations in accordance with the determined destination to accommodate communication flows.

<Twenty-Ninth Mode>

The control method of the control apparatus according to the twenty-eighth mode, including a step of calculating an average value of communication flows accommodated in a transmission medium, based on the number of communication flows accommodated in each transmission medium used by each of the plurality of second paths and the number of transmission media used by each of the second paths, and determining a destination to accommodate communication flows specified according to at least one of the first to third packet handling operations based on the average value.

<Thirtieth Mode>

The control method of the control apparatus according to the twenty-seventh mode, including a step of determining a destination to accommodate communication flows specified according to at least one of the first to third packet handling operations, based on an estimated value of bandwidth for each transmission medium used by the plurality of second paths.

<Thirty-First Mode>

As in the program according to the fourth aspect described above.

<Thirty-Second Mode>

The program according to the thirty-first mode, wherein the program executes a process of determining a destination to accommodate communication flows specified according to the first packet handling operation or a second packet handling operation set in a second communication apparatus that forms links in the second layer, based on information related to the second layer.

<Thirty-Third Mode>

The program according to the thirty-second mode, wherein the program executes a process of determining a destination to accommodate communication flows specified according to the first and/or second packet handling operation, based on information related to a first path that implements links in the second layer.

<Thirty-Fourth Mode>

The program according to the thirty-third mode, wherein the program executes a process of determining a destination to accommodate communication flows specified according to the first and/or second packet handling operation, by statistical processing of the number of communication flows accommodated in the first path.

<Thirty-Fifth Mode>

The program according to the thirty-fourth mode, wherein the program executes a process of counting the number of communication flows accommodated in each of a plurality of the first paths, determining the first path with the smallest number of accommodated communication flows as a destination to accommodate communication flows, and also generating the first and/or second packet handling operation in accordance with the determined destination to accommodate communication flows.

<Thirty-Sixth Mode>

The program according to any one of the thirty-second to thirty-fifth modes, wherein the program executes a process of determining a destination to accommodate communication flows specified according to at least one of the first packet handling operation, the second packet handling operation, and a third packet handling operation set in a third communication apparatus that forms links in a third layer that differs from the first and second layers, based on information related to the third layer.

<Thirty-Seventh Mode>

The program according to the thirty-sixth mode, wherein the program executes a process of determining a destination to accommodate communication flows specified according to at least one of the first to third packet handling operations, by statistical processing of the number of communication flows accommodated in each of a plurality of second paths that implement the third layer.

<Thirty-Eighth Mode>

The program according to the thirty-seventh mode, wherein the program executes a process of counting the number of communication flows accommodated in each of the plurality of second paths, determining the second path with the smallest number of accommodated communication flows as a destination to accommodate communication flows, and also generating at least one of the first to third packet handling operations in accordance with the determined destination to accommodate communication flows.

<Thirty-Ninth Mode>

The program according to the thirty-eighth mode, wherein the program executes a process of calculating an average value of communication flows accommodated in a transmission medium, based on the number of communication flows accommodated in each transmission medium used by each of the plurality of second paths and the number of transmission media used by each of the second paths, and determining a destination to accommodate communication flows specified according to at least one of the first to third packet handling operations based on the average value.

<Fortieth Mode>

The program according to the thirty-seventh mode, wherein the program executes a process of determining a destination to accommodate communication flows specified according to at least one of the first to third packet handling operations, based on an estimated value of bandwidth for each transmission medium used by the plurality of second paths.

It is to be noted that the various disclosures of the cited patent literature described above are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values or small ranges included in the relevant ranges should be interpreted to be specifically described even where there is no particular description thereof. It is to be noted that in the disclosure of the present application, elements represented in the singular form may also represent pluralities, as necessary. This point is based on the characteristics of the Japanese language.

10, 10-1 to 10-3 OpenFlow switch
11 communication unit
12 table management unit
13 table database (table DB)
14 forwarding processing unit
20, 20a to 20c, 100 control apparatus
21 network configuration management unit
22 network configuration database (network configuration DB)
23 control message processing unit
24 path/action calculation unit
25 network path database (network path DB)
26 packet handling operation management unit
27 packet handling operation database (packet handling operation DB)
28 node communication unit
30 communication terminal
40-1, 40-2 server
50, 50-1 to 50-4 packet transport node
60, 60-1 to 60-4, 70, 70-1 to 70-7 optical cross-connect
101 first communication apparatus
141 table retrieval unit
142 action execution unit

What is claimed is:

1. A communication system, comprising:
a control apparatus that controls communication apparatus(s) included in a hierarchical network; and
a first communication apparatus that forms links in a first layer of said network and also performs processing related to communication flows based on a first packet handling operation, wherein
said control apparatus determines a first destination to accommodate communication flows specified according to said first packet handling operation, based on information related to a second layer that differs from said first layer;
a second communication apparatus that forms links in said second layer, and also performs processing related to communication flow based on a second packet handling operation, wherein
said control apparatus determines a second destination to accommodate communication flows specified according to said first and/or second packet handling operation based on information related to said second layer; and
a third communication apparatus that forms links in a third layer different from said first and said second layers, and also performs processing related to communication flows based on a third packet handling operation,
wherein said control apparatus determines a third destination to accommodate communication flows specified according to at least one of said first to third packet handling operations, based on information related to said third layer,
wherein said control apparatus determines the second destination to accommodate communication flows specified according to said first and/or second packet handling operation, based on information related to a first path that implements links in said second layer,
wherein said control apparatus determines the third destination to accommodate communication flows specified according to at least one of said first to third packet handling operations, by statistical processing of the number of communication flows accommodated in each of a plurality of second paths implementing said third layer, and
wherein said control apparatus determines the third destination to accommodate communication flows specified according to at least one of said first to third packet handling operations, based on an estimated value of bandwidth for each transmission medium used by said plurality of second paths,
wherein
each the transmission medium used by the plurality of second paths comprises optical fiber cables, and
the control apparatus calculates an estimated value of bandwidth for each optical fiber cable used by the second path by using following formula, $$\text{Bandwidth} = \frac{X}{\omega} \times \text{Min}\left(\frac{W}{R}, \frac{C}{R\sqrt{P}}\right)$$

wherein, W indicates receive window, R indicates round trip delay time, P indicates packet loss rate, C indicates a constant, X indicates a number of TCP/IP flows accommodated in each optical fiber cable, and ω indicates a link bandwidth of each optical fiber cable.

2. The communication system according to claim 1, wherein said control apparatus determines the second destination to accommodate communication flows specified according to said first and/or second packet handling operation, by statistical processing of a number of communication flows accommodated in said first path.

3. The communication system according to claim 2, wherein said control apparatus counts the number of communication flows accommodated in each of a plurality of said first paths, determines the first path with the smallest number of accommodated communication flows as a destination to accommodate communication flows, and also generates said first and/or second packet handling operation in accordance with said determined second destination to accommodate communication flows.

4. The communication system according to claim 1, wherein said control apparatus counts the number of communication flows accommodated in each of said plurality of second paths, determines the second path with the smallest number of accommodated communication flows as a destination to accommodate communication flows, and also generates at least one of said first to third packet handling operations in accordance with said determined third destination to accommodate communication flows.

5. The communication system according to claim 4, wherein said control apparatus calculates an average value of communication flows accommodated in a transmission medium, based on a number of communication flows accommodated in each transmission medium used by each of said plurality of second paths and a number of transmission media used by each of said second paths, and determines the third destination to accommodate communication flows specified according to at least one of said first to third packet handling operations based on said average value.

6. A control apparatus, comprising:
a memory storing instructions;
a processor configured to execute the instructions to:
determine a first destination to accommodate communication flows via a first communication apparatus that forms links in a first layer of a hierarchical network, based on information related to a second layer that differs from said first layer;

form links, by a second communication apparatus, in said second layer, and also performs processing related to communication flows based on a second packet handling operation, wherein said control apparatus, a second destination to accommodate communication flows specified according to said first and/or second packet handling operation, based on information related to said second layer; and form links, by a third communication apparatus, in a third layer different from said first and said second layers, and also performs processing related to communication flows based on a third packet handling operation, wherein said control apparatus determines a third destination to accommodate communication flows specified according to at least one of said first to third packet handling operations, based on information related to said third layer, wherein said control apparatus determines the second destination to accommodate communication flows specified according to said first and/or second packet handling, operation, based on information related to a first path that implements links in said second layer, wherein said control apparatus determines the third destination to accommodate communication flows specified according to at least one of said first to third packet handling operations, by statistical processing of the number of communication flows accommodated in each of a plurality of second paths implementing said third layer, and wherein said control apparatus determines the third destination to accommodate communication flows specified according to at least one of said first to third packet handling operations, based on an estimated value of bandwidth for each transmission medium used by said plurality of second paths, wherein each the transmission medium used by the plurality of second paths comprises optical fiber cables, and the control apparatus calculates an estimated value of bandwidth for each optical fiber cable used by the second path by using following formula, $$\text{Bandwidth} = \frac{X}{\omega} \times \text{Min}\left(\frac{W}{R}, \frac{C}{R\sqrt{P}}\right)$$

wherein, W indicates receive window, R indicates round trip delay time, P indicates packet loss rate, C indicates a constant, X indicates a number of TCP/IP flows accommodated in each optical fiber cable, and ω indicates a link bandwidth of each optical fiber cable.

7. The control apparatus according to claim 6, wherein said control apparatus determines the first destination to accommodate communication flows specified according to a first packet handling operation set in said first communication apparatus, or a second packet handling operation set in a second communication apparatus that forms links in said second layer, based on information related to said second layer.

8. The control apparatus according to claim 7, wherein said control apparatus determines the second destination to accommodate communication flows specified according to said first and/or second packet handling operation, based on information related to a first path that implements links in said second layer.

9. The control apparatus according to claim 8, wherein said control apparatus determines the second destination to accommodate communication flows specified according to said first and/or second packet handling operation, by statistical processing of a number of communication flows accommodated in said first path.

10. The control apparatus according to claim 9, wherein said control apparatus counts the number of communication flows accommodated in each of a plurality of said first paths, determines the first path with the smallest number of accommodated communication flows as a destination to accommodate communication flows, and also generates said first and/or second packet handling operation in accordance with said determined second destination to accommodate communication flows.

11. The control apparatus according to claim 7, wherein said control apparatus determines the third destination to accommodate communication flows specified according to at least one of said first packet handling operation, said second packet handling operation, and the third packet handling operation set in the third communication apparatus that forms links in the third layer that differs from said first and second layers, based on information related to said third layer.

12. The control apparatus according to claim 11, wherein said control apparatus counts the number of communication flows accommodated in each of said plurality of second paths, determines the second path with the smallest number of accommodated communication flows as a destination to accommodate communication flows, and also generates at least one of said first to third packet handling operations in accordance with said determined third destination to accommodate communication flows.

13. The control apparatus according to claim 12, wherein said control apparatus calculates an average value of communication flows accommodated in a transmission medium, based on a number of communication flows accommodated in each transmission medium used by each of said plurality of second paths and a number of transmission media used by each of said second paths, and determines the third destination to accommodate communication flows specified according to at least one of said first to third packet handling operations based on said average value.

14. A control method fix a control apparatus that controls communication apparatus(s) included in a hierarchical network, said method comprising:

determining a first destination to accommodate communication flows via a first communication apparatus that forms links in a first layer of said network, based on information related to a second layer that differs from said first layer;

of setting a first packet handling operation in accordance with said determined first destination to accommodate communication flows, in said first communication apparatus;

forming links, by a second communication apparatus, in said second layer, and also performing processing related to communication flows based on a second packet handling operation, wherein said control apparatus determines a second destination to accommodate communication flows, specified according to said first and/or second packet handling operation, based on information related to said second layer; and forming links, by a third communication apparatus, in a third layer different from said first and said second layers, and also performs processing related to communication flows based on a third packet handling operation, wherein the determining a third destination to accommodate communication flows is specified according to at least one of said first to third packet handling operations, based on information related to said third layer, wherein said control apparatus determines the second destination to accommodate communication flows specified according to said first and/or second packet handling operation, based on information related to a first path that implements links in said second layer, wherein the determining the third destination to accommodate communication flows is specified according to at least one of said first to third packet handling operations, by statistical processing of the number of communication flows accommodated in each of a plurality of second paths implementing said third layer, and wherein the determining the third destination to accommodate communication flows is specified according to at least one of said first to third packet handling operations, based on an estimated value of bandwidth for each transmission medium used by said plurality of second paths, wherein each the transmission medium used by the plurality of second paths comprises optical fiber cables, and the control apparatus calculates an estimated value of bandwidth for each optical fiber cable used by the second path by using following formula, $$\text{Bandwidth} = \frac{X}{\omega} \times \text{Min}\left(\frac{W}{R}, \frac{C}{R\sqrt{P}}\right)$$

wherein, W indicates receive window, R indicates round trip delay time, indicates packet loss rate, C indicates a constant, X indicates a number of TCP/IP flows accommodated in each optical fiber cable, and ω indicates a link bandwidth of each optical fiber cable.

15. A non-transitory computer-readable recording medium storing a program to execute, on a computer comprising a control apparatus that controls communication apparatus(s) included in a hierarchical network, said program executing:

a process of determining a first destination to accommodate communication flows via a first communication apparatus that forms links in a first layer of said network, based on information related to a second layer that differs from said first layer, and a process of setting a first packet handling operation in accordance with said determined first destination to accommodate communication flows, in said first communication apparatus;

a process of forming links, by a second communication apparatus, in said second layer, and also performing processing related to communication flows based on a second packet handling operation, wherein said control apparatus determines a second destination to accommodate communication flows specified according to said first and/or second packet handling operation, based on information related to said second layer; and a process of forming links, by a third communication apparatus, in a third layer different from said first and said second layers, and also performs processing related to communication flows based on a third packet handling operation, wherein the process of determining a third destination to accommodate communication flows is specified according to at least one of said first to third packet handling operations, based on information related to said third layer, wherein said control apparatus determines the second destination to accommodate communication flows specified according to said first and/or second packet handling operation, based on information related to a first path that implements links in said second layer, wherein the process of determining the third destination to accommodate communication flows is specified according to at least one of said first to third packet handling operations, by statistical processing of the number of communication flows accommodated in each of a plurality of second paths implementing said third layer, and wherein the process of determining the third, destination to accommodate communication flows is specified according to at least one of said first to third packet handling operations, based on an estimated value of bandwidth for each transmission medium used by said plurality of second paths, wherein each the transmission medium used by the plurality of second paths comprises optical fiber cables, and the control apparatus calculates an estimated value of bandwidth for each optical fiber cable used by the second path by using following formula, $$\text{Bandwidth} = \frac{X}{\omega} \times \text{Min}\left(\frac{W}{R}, \frac{C}{R\sqrt{P}}\right)$$

wherein, W indicates receive window, R indicates round trip delay time, P indicates packet loss rate, C indicates a constant, X indicates a number of TCP/IP flows accommodated in each optical fiber cable, and ω indicates a link bandwidth of each optical fiber cable.

* * * * *